(12) United States Patent
Oobayashi

(10) Patent No.: US 8,431,634 B2
(45) Date of Patent: Apr. 30, 2013

(54) POLYPROPYLENE RESIN COMPOSITION AND PROCESS FOR PRODUCING THE SAME

(75) Inventor: Yoshiaki Oobayashi, Yokohama (JP)

(73) Assignee: Sumitomo Chemical Company, Limited, Tokyo (JP)

(*) Notice: Subject to any disclaimer, the term of this patent is extended or adjusted under 35 U.S.C. 154(b) by 159 days.

(21) Appl. No.: 12/873,468

(22) Filed: Sep. 1, 2010

(65) Prior Publication Data

US 2011/0060075 A1 Mar. 10, 2011

(30) Foreign Application Priority Data

Sep. 7, 2009 (JP) ................................. 2009-205689

(51) Int. Cl.
*C08J 3/22* (2006.01)
(52) U.S. Cl.
USPC .......................................... 523/351; 524/394
(58) Field of Classification Search .................. 523/351; 524/394
See application file for complete search history.

(56) References Cited

U.S. PATENT DOCUMENTS

| | | | |
|---|---|---|---|
| 2003/0027908 A1 | 2/2003 | Dotson et al. | |
| 2006/0155073 A1 | 7/2006 | Oobayashi et al. | |
| 2007/0036960 A1 | 2/2007 | Lambert et al. | |
| 2007/0066733 A1 | 3/2007 | Hanssen et al. | |
| 2011/0014407 A1* | 1/2011 | Doufas | ...................... 428/36.91 |

FOREIGN PATENT DOCUMENTS

| | | |
|---|---|---|
| EP | 0 534 776 A1 | 3/1993 |
| JP | 02-049047 A | 2/1990 |
| JP | 05-194685 A | 8/1993 |
| JP | 2004-525227 T | 8/2004 |
| JP | 2006-213918 A | 8/2006 |
| JP | 2009-504842 T | 2/2009 |
| JP | 2009-508995 T | 3/2009 |

* cited by examiner

*Primary Examiner* — Edward Cain
(74) *Attorney, Agent, or Firm* — Panitch Schwarze Belisario & Nadel LlP

(57) ABSTRACT

A polypropylene resin composition comprising (a) 100 parts by weight of a resin composition, which contains 51 to 99% by weight of a propylene polymer and 1 to 49% by weight of an ethylene polymer having a density of 0.85 to 0.93 g/cm$^3$, and (b) 0.001 to 0.5 part by weight of a metal salt defined by a specific chemical formula; and a process for producing such a polypropylene resin composition, comprising the steps of (1) mixing 1 to 100 parts by weight of the metal salt with 100 parts by weight of the propylene polymer and/or the ethylene polymer, thereby producing a master batch, and (2) mixing the master batch with a mixture containing the propylene polymer and the ethylene polymer.

8 Claims, No Drawings

US 8,431,634 B2

POLYPROPYLENE RESIN COMPOSITION AND PROCESS FOR PRODUCING THE SAME

FIELD OF THE INVENTION

The present invention relates to a polypropylene resin composition excellent in a balance between its tensile strength and impact resistance, and a process for producing the polypropylene resin composition.

BACKGROUND OF THE INVENTION

A resin composition comprising a propylene polymerization unit-containing resin and a nucleating agent is so superior in its property such as a mechanical property and transparency that it is widely utilized as a material for a use such as automobile interior parts, automobile exterior parts, home electric appliances, building materials, agricultural materials, convenience goods, films, bottles, caps, containers, and pallets.

Such a resin composition is disclosed in a patent document such as JP 2006-213918A (corresponding to US 2006-155073A) and JP 2009-508995A (corresponding to US 2007-66733A). The former document discloses a resin composition comprising a propylene-based block copolymer (A), which contains a propylene-based polymer component (I) and a component (II) obtained by copolymerizing propylene with a monomer selected from the group consisting of ethylene and an α-olefin having 4 to 12 carbon atoms, and a nucleating agent (B) having a particle diameter within a specified range. The latter document discloses a resin composition comprising a polyolefin and a nucleating or transparency agent dispersed or dissolved in the polyolefin.

SUMMARY OF THE INVENTION

However, traditional resin compositions such as the above-mentioned resin compositions are not yet sufficient in a balance between their tensile strength and impact resistance.

In view of the above circumstances, the present invention has an object to provide a polypropylene resin composition excellent in a balance between its tensile strength and impact resistance.

The present invention is a polypropylene resin composition comprising:
100 parts by weight of a resin composition, which contains 51 to 99% by weight of a propylene polymer and 1 to 49% by weight of an ethylene polymer having a density of 0.85 to 0.93 g/cm$^3$, provided that the total of the propylene polymer and the ethylene polymer is 100% by weight; and
0.001 to 0.5 part by weight of a metal salt represented by following formula (I),

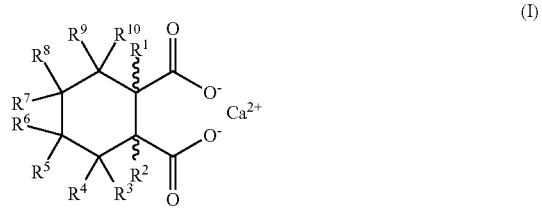

wherein $R^1$ to $R^{10}$ are independently of one another a hydrogen atom, an alkyl group having 1 to 9 carbon atoms, a hydroxyl group, an alkoxy group having 1 to 9 carbon atoms, an amino group, an alkylamine group having 1 to 9 carbon atoms, a halogen atom, a phenyl group, or a group represented by the formula, R—(R'—O)$_n$—, R being an alkyl group having 1 to 3 carbon atoms, R' being an alkylene group having 2 or 3 carbon atoms, and n being an integer of 1 to 4; any two alkyl groups of $R^1$ to $R^{10}$ may be linked to each other, thereby forming a carbon ring having 3 to 6 carbon atoms; and $R^1$ and $R^2$ have a trans or cis configuration with each other.

Also, the present invention is a process for producing the above-mentioned polypropylene resin composition, comprising the steps of:

(1) mixing 1 to 100 parts by weight of a metal salt represented by above formula (I) with 100 parts by weight of a propylene polymer, or 100 parts by weight of an ethylene polymer having a density of 0.85 to 0.93 g/cm$^3$, or 100 parts by weight of a mixture containing the propylene polymer and the ethylene polymer, thereby producing a master batch; and (2) mixing the master batch with another mixture containing the propylene polymer and the ethylene polymer.

DETAILED DESCRIPTION OF THE INVENTION

The term "propylene polymer" in the present invention means a polymer containing a propylene unit as a major monomer unit; that is, a polymer containing more than 50% by weight of a propylene unit, provided that the total of the propylene polymer is 100% by weight. The above term "monomer unit" means a polymerization unit of a monomer, and therefore, the term "propylene unit" means a polymerization unit of propylene. Typical examples of the propylene polymer are a propylene homopolymer; a propylene-ethylene random copolymer; a propylene-α-olefin random copolymer; a propylene-ethylene-α-olefin random copolymer; a propylene-cyclic olefin random copolymer; a polymer produced by a process comprising the polymerization steps of (I) homopolymerizing propylene, or copolymerizing propylene as a major monomer with ethylene and/or α-olefin as a minor monomer, thereby forming a polymer component (I) (that is, propylene homo- or co-polymer component (I)), and then (II) copolymerizing propylene with ethylene and/or α-olefin in the presence of the polymer component (I), thereby forming a polymer component (II) (that is, propylene copolymer component (II)); and a combination of two or more thereof. The above polymer produced by a process comprising the steps of (I) and (II) is substantially a mixture of polymer components (I) and (II). Such a polymer is habitually referred to as an "impact-copolymer" by those skilled in the art. Also, such a polymer is habitually referred to as a "propylene block copolymer" by those skilled in the art, although the polymer is not a typical block copolymer such as a styrene-butadiene block copolymer appeared in general polymer textbooks, but substantially a mixture of polymer components (I) and (II) as mentioned above.

Typical examples of the above α-olefin are α-olefins having 4 to 10 carbon atoms, such as 1-butene, 1-pentene, 1-hexene, 4-methyl-1-pentene, 1-octene and 1-decene. Among them, preferred is 1-butene, 1-hexene or 1-octene.

Examples of the above cyclic olefin are cyclobutene, cyclopentene, cyclohexene, cycloheptene, 1,3-cyclohexadiene, 1,4-cyclohexadiene, 1,5-cyclooctadiene, and norbornene.

From a viewpoint of a balance between tensile strength and impact resistance of the polypropylene resin composition of the present invention, the propylene polymer has an isotactic pentad fraction (mmmm fraction) of preferably 0.97 or more, and more preferably 0.98 or more, measured according to $^{13}$C-nuclear magnetic resonance ($^{13}$C-NMR analysis). The isotactic pentad fraction is a barometer indicating a degree of an isotactic structure (namely, isotacticity) contained in the propylene polymer, wherein quaternary carbon atoms (asymmetric carbon atoms) contained therein have the same absolute configuration as one another. The larger a value of the isotactic pentad fraction is, the larger isotacticity the propylene polymer has. Therefore, the larger a value of the isotactic pentad fraction is, the higher melting temperature and the higher crystallinity the propylene polymer has. The isotactic pentad fraction is measured by a measurement method mentioned hereinafter. When the propylene polymer is the above-mentioned propylene-ethylene random copolymer, propylene-α-olefin random copolymer, propylene-ethylene-α-olefin random copolymer, propylene-cyclic olefin random copolymer, or polymer comprising polymer components (I) and (II), an isotactic pentad fraction of a polymer chain consisting of propylene units is measured, and in case of the polymer comprising polymer components (I) and (II), an isotactic pentad fraction of the polymer component (I) is measured.

From a viewpoint of a balance between tensile strength and impact resistance, moldability and processability of the polypropylene resin composition of the present invention, the propylene polymer has a melt flow rate of preferably 0.5 to 200 g/10 minutes, more preferably 1 to 100 g/10 minutes, further preferably 2 to 80 g/10 minutes, and most preferably 5 to 50 g/10 minutes, measured at 230° C. under a load of 2.16 kg.

The propylene polymer can be produced using a conventional polymerization catalyst and a conventional polymerization method. Examples of the polymerization catalyst are (1) a Ziegler catalyst system, (2) a Ziegler-Natta catalyst system, (3) a catalyst system comprising (3-1) a cyclopentadienyl ring-containing transition metal compound of Group 4 of the Periodic Table and (3-2) an alkylaluminoxane, (4) a catalyst system comprising (4-1) a cyclopentadienyl ring-containing transition metal compound of Group 4, (4-2) a compound which forms an ionic complex by reacting with the cyclopentadienyl ring-containing transition metal compound, and (4-3) an organoaluminum compound, and (5) a catalyst system obtained by a method comprising the steps of (5-1) supporting a catalyst component (such as a cyclopentadienyl ring-containing transition metal compound of Group 4, a compound which forms an ionic complex by reacting with the cyclopentadienyl ring-containing transition metal compound, and an organoaluminum compound) on inorganic particles such as silica and clay mineral, and (5-2) modifying the resultant supported material. Also, the polymerization catalyst may be a pre-polymerization catalyst prepared by pre-polymerizing ethylene or an α-olefin in the presence of the above catalyst system.

Examples of the above catalyst systems are those disclosed in a patent document such as JP 61-218606A (corresponding to U.S. Pat. No. 4,672,050), JP 5-194685A (corresponding to EP 534776A), JP 7-216017A (corresponding to U.S. Pat. No. 5,608,018), JP 9-316147A (corresponding to U.S. Pat. No. 5,990,242), JP 10-212319A (corresponding to U.S. Pat. No. 6,187,883), and JP 2004-182981A.

Examples of the polymerization method are a bulk polymerization method using an olefin which is liquid at a polymerization temperature, as a polymerization medium; a solution or slurry polymerization method carried out in an inert hydrocarbon solvent such as propane, butane, isobutane, pentane, hexane, heptane and octane; a gas phase polymerization method, which polymerizes a gaseous monomer in a medium containing a gaseous monomer; and a combination of two or more thereof. These polymerization methods are carried out according to a batchwise manner, a continuous manner, or a combination thereof. The continuous manner is usually carried out by use of two or more continuously-connected polymerization reactors, which is sometimes referred to as a multistage manner, a proportion and characteristic of a produced polymer being regulated in each of those polymerization reactors. Among them, from an industrial and economical point of view, preferred is a continuous gas phase polymerization method, or a bulk-gas phase polymerization method performing continuously a bulk polymerization method and a gas phase polymerization method.

Polymerization conditions for the propylene polymer, such as polymerization temperature, pressure and time, a monomer concentration and a used amount of a catalyst are determined suitably according to characteristics of the propylene polymer targeted.

The produced propylene polymer may be dried at a high temperature lower than its melting temperature, in order to remove a solvent and by-products such as a very-low-molecular weight oligomer contained in the produced propylene polymer. Such a drying method is disclosed in a patent literature such as JP 55-75410A (corresponding to EP 6421A) and JP 2565753B (corresponding to U.S. Pat. No. 5,109,056).

When the propylene polymer is a propylene random copolymer such as the above-mentioned propylene-ethylene random copolymer, propylene-α-olefin random copolymer and propylene-ethylene-α-olefin random copolymer, the propylene random copolymer satisfies preferably the following requirements (a) and (b):

(a) its melt flow rate is 0.5 to 200 g/10 minutes, preferably 1 to 100 g/10 minutes, more preferably 2 to 80 g/10 minutes, and further preferably 5 to 50 g/10 minutes, measured at 230° C. under a load of 2.16 kg; and (b) it contains an ethylene unit and/or an α-olefin unit having 4 to 10 carbon atoms in an amount of 0.1 to 40% by weight, preferably 0.1 to 30% by weight, more preferably 0.2 to 20% by weight, and further preferably 2 to 15% by weight, and contains a propylene unit in an amount of 60 to 99.9% by weight, preferably 70 to 99.9% by weight, more preferably 80 to 99.8% by weight, and further preferably 85 to 98% by weight, provided that the total of the propylene unit, ethylene unit and α-olefin unit is 100% by weight.

Examples of the propylene-α-olefin random copolymer are a propylene-1-butene random copolymer, a propylene-1-hexene random copolymer, a propylene-1-octene random copolymer, and a propylene-1-decene random copolymer.

Examples of the propylene-ethylene-α-olefin random copolymer area propylene-ethylene-1-butene random copolymer, a propylene-ethylene-1-hexene random copolymer, a propylene-ethylene-1-octene random copolymer, and a propylene-ethylene-1-decene random copolymer.

When the propylene polymer is the above-mentioned polymer comprising polymer components (I) and (II), the propylene polymer satisfies preferably the following requirements (c), (d) and (e):

(c) polymer component (I) has an intrinsic viscosity ($[\eta]_I$) of 0.1 to 5 dl/g, preferably 0.3 to 4 dl/g, more preferably 0.5 to 3 dl/g, and further preferably 0.5 to 2 dl/g, and polymer component (II) has an intrinsic viscosity ($[\eta]_{II}$) of 1 to 20 dl/g, preferably 1 to 10 dl/g, more preferably 2 to 7 dl/g, and further preferably 3 to 7 dl/g, measured at 135° C. in tetralin;

(d) polymer component (II) contains an ethylene unit and/or an α-olefin unit having 4 to 10 carbon atoms in an amount of 1 to 80% by weight, provided that the total of polymer component (II) is 100% by weight; and (e) polymer component (II) is contained in the polymer in an amount of 1 to 50% by weight, provided that the total of polymer components (I) and (II) is 100% by weight.

A ratio of the above $[\eta]_{II}$ to the above $[\eta]_{I}$, $[\eta]_{II}/[\eta]_{I}$, is preferably 1 to 20, more preferably 2 to 10, and further preferably 3 to 8.

When polymer component (I) is a copolymer of propylene with ethylene and/or α-olefin, polymer component (I) contains 0.01 to 30% by weight of an ethylene unit and/or α-olefin unit, provided that the total of polymer component (I) is 100% by weight. The α-olefin is preferably 1-butene, 1-hexene, or 1-octene, and more preferably 1-butene. Examples of the copolymer are a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer.

Polymer component (I) is preferably a propylene homopolymer, a propylene-ethylene copolymer, a propylene-1-butene copolymer, or a propylene-ethylene-1-butene copolymer.

Polymer component (II) contains an ethylene unit and/or an α-olefin unit in an amount of 1 to 80% by weight, preferably 5 to 60% by weight, and more preferably 20 to 60% by weight, provided that the total of polymer component (II) is 100% by weight. The α-olefin is preferably 1-butene, 1-hexene, or 1-octene, and more preferably 1-butene.

Examples of polymer component (II) are a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene-1-octene copolymer, and a propylene-1-decene copolymer. Among them, preferred is a propylene-ethylene copolymer, a propylene-1-butene copolymer, or a propylene-ethylene-1-butene copolymer, and more preferred is a propylene-ethylene copolymer.

The polymer comprising polymer components (I) and (II) contains polymer component (II) in an amount of typically 1 to 50% by weight, preferably 1 to 40% by weight, more preferably 10 to 40% by weight, and further preferably 10 to 30% by weight, provided that the total of polymer components (I) and (II) is 100% by weight.

When polymer component (I) is a propylene homopolymer, examples of the polymer comprising polymer components (I) and (II) are a (propylene)-(propylene-ethylene) polymer, a (propylene)-(propylene-ethylene-1-butene) polymer, a (propylene)-(propylene-ethylene-1-hexene) polymer, a (propylene)-(propylene-ethylene-1-octene) polymer, a (propylene)-(propylene-1-butene) polymer, a (propylene)-(propylene-1-hexene) polymer, a (propylene)-(propylene-1-octene) polymer, and a (propylene)-(propylene-1-decene) polymer. The former term "(propylene)" in these polymers means polymer component (I) of a propylene homopolymer, and the latter term such as "(propylene-ethylene)" means polymer component (II) of a copolymer such as a propylene-ethylene copolymer.

When polymer component (I) is a propylene-ethylene copolymer, a propylene-α-olefin copolymer, or a propylene-ethylene-α-olefin copolymer, examples of the polymer comprising polymer components (I) and (II) are a (propylene-ethylene)-(propylene-ethylene) polymer, a (propylene-ethylene)-(propylene-ethylene-1-butene) polymer, a (propylene-ethylene)-(propylene-ethylene-1-hexene) polymer, a (propylene-ethylene)-(propylene-ethylene-1-octene) polymer, a (propylene-ethylene)-(propylene-ethylene-1-decene) polymer, a (propylene-ethylene)-(propylene-1-butene) polymer, a (propylene-ethylene)-(propylene-1-hexene) polymer, a (propylene-ethylene)-(propylene-1-octene) polymer, a (propylene-ethylene)-(propylene-1-decene) polymer, a (propylene-1-butene)-(propylene-ethylene-1-butene) polymer, a (propylene-1-butene)-(propylene-ethylene-1-hexene) polymer, a (propylene-1-butene)-(propylene-ethylene-1-octene) polymer, a (propylene-1-butene)-(propylene-ethylene-1-decene) polymer, a (propylene-1-butene)-(propylene-1-butene) polymer, a (propylene-1-butene)-(propylene-1-hexene) polymer, a (propylene-1-butene)-(propylene-1-octene) polymer, a (propylene-1-hexene)-(propylene-1-hexene) polymer, a (propylene-1-hexene)-(propylene-1-octene) polymer, a (propylene-1-hexene)-(propylene-1-decene) polymer, a (propylene-1-octene)-(propylene-1-octene) polymer, and a (propylene-1-octene)-(propylene-1-decene) polymer. The former term such as "(propylene-ethylene)" in these polymers means polymer component (I) of a copolymer such as a propylene-ethylene copolymer, and the latter term such as "(propylene-ethylene)" means polymer component (II) of a copolymer such as a propylene-ethylene copolymer.

The polymer comprising polymer components (I) and (II) is preferably a (propylene)-(propylene-ethylene) polymer, a (propylene)-(propylene-ethylene-1-butene) polymer, a (propylene-ethylene)-(propylene-ethylene) polymer, a (propylene-ethylene)-(propylene-ethylene-1-butene) polymer, or a (propylene-1-butene)-(propylene-1-butene) polymer, and more preferably a (propylene)-(propylene-ethylene) polymer.

When the propylene polymer is a propylene-α-olefin random copolymer, an amount of an α-olefin unit contained in the propylene polymer can be determined based on a $^{13}$C-NMR spectrum of the propylene polymer.

Also, when the propylene polymer comprises polymer component (I) and an α-olefin unit-containing polymer component (II), an amount of an α-olefin unit contained in polymer component (II) can be determined as follows:

(1) when polymer component (I) contains no α-olefin unit, an amount of an α-olefin unit contained in polymer component (II) can be determined based on an amount of an α-olefin unit contained in the propylene polymer measured by a $^{13}$C-NMR method, and an amount of polymer component (II); and (2) when polymer component (I) contains the same α-olefin in its kind as that contained in polymer component (II), an amount of an α-olefin unit contained in polymer component (II) can be determined based on (i) respective amounts of polymer components (I) and (II) obtained based on a material balance in a production of the propylene polymer, (ii) an amount of an α-olefin unit contained in polymer component (I) measured by a $^{13}$C-NMR method, and (iii) an amount of an α-olefin unit contained in the propylene polymer measured by a $^{13}$C-NMR method.

The intrinsic viscosity in the present invention, such as above $[\eta]_{I}$ and $[\eta]_{II}$, is measured by a method (extrapolation method) comprising the steps of:

(1) measuring reduced viscosities of three tetralin solutions having concentrations of 0.1 g/dl, 0.2 g/dl and 0.5 g/dl, respectively, at 135° C. with an Ubbellohde viscometer;

(2) plotting the above-obtained reduced viscosities for those concentrations, respectively; and (3) extrapolating the concentration to zero, thereby obtaining an intrinsic viscosity.

The extrapolation method is disclosed in "Kobunshi Yoeki, Kobunshi Jikkengaku 11" (published by Kyoritsu Shuppan Co. Ltd. in 1982), page 491.

The above intrinsic viscosity of polymer component (I), $[\eta]_I$, is measured using polymer component (I) taken out from a polymerization reactor in polymerization step (I) mentioned above.

The above intrinsic viscosity of polymer component (II), $[\eta]_{II}$, is calculated from the following formula:

$$[\eta]_{II}=([\eta]_{Total}-[\eta]_I \times X_I)/X_{II}$$

wherein $[\eta]_{Total}$ is an intrinsic viscosity of the polymer comprising polymer components (I) and (II); $X_I$ is a proportion by weight of polymer component (I) in the polymer; $X_{II}$ is a proportion by weight of polymer component (II) in the polymer; and $X_I$ and $X_{II}$ are obtained based on a material balance in a production of the polymer.

The term "ethylene polymer" in the present invention means an ethylene homopolymer or an ethylene-olefin copolymer, both having a density of 0.85 to 0.93 g/cm³. Examples of the olefin are an α-olefin such as those mentioned hereinafter, and a cyclic olefin such as cyclobutene, cyclopentene, cyclohexene, cycloheptene, 1,3-cyclohexadiene, 1,4-cyclohexadiene, 1,5-cyclooctadiene, and norbornene.

Examples of the ethylene polymer are a low-density polyethylene (LDPE) having a density of 0.91 to 0.93 g/cm³, produced by a high-pressure radical polymerization process using a polymerization catalyst of a radical initiator; a linear low-density polyethylene (LLDPE) having a density of 0.90 to 0.93 g/cm³ and crystallinity; and an ethylene-olefin copolymer elastomer having a density of 0.85 to 0.90 g/cm³, a rubber-like elastic property, and low crystallinity.

A typical α-olefin in the above ethylene-α-olefin copolymer is an α-olefin having 3 to 10 carbon atoms, and examples thereof are propylene, 1-butene, 1-pentene, 1-hexene, 4-methyl-1-pentene, 1-octene, and 1-decene. Among them, preferred is 1-butene, 1-hexene or 1-octene.

The ethylene polymer is preferably an ethylene-α-olefin copolymer. Examples of the ethylene-α-olefin copolymer are an ethylene-1-butene copolymer, an ethylene-1-hexene copolymer, an ethylene-1-octene copolymer, an ethylene-1-decene copolymer, and an ethylene-(3-methyl-1-butene) copolymer.

The ethylene-α-olefin copolymer contains an ethylene unit in an amount of preferably 51 to 99% by weight, more preferably 51 to 95% by weight, and further preferably 51 to 90% by weight, and an α-olefin unit in amount of preferably 1 to 49% by weight, more preferably 5 to 49% by weight, and further preferably 10 to 49% by weight, provided that the total of an ethylene unit and an α-olefin unit is 100% by weight. The α-olefin is preferably an α-olefin having 4 to 10 carbon atoms.

The ethylene polymer has a melt flow rate of preferably 0.5 to 50 g/10 minutes, more preferably 1 to 30 g/10 minutes, and further preferably 1 to 20 g/10 minutes, measured at 190° C. under a load of 2.16 kg.

The ethylene polymer is preferably an ethylene-olefin copolymer elastomer having a density of 0.85 to 0.90 g/cm³, a rubber-like elastic property, and low crystallinity, and more preferably such an elastomer having a density of 0.85 to 0.89 g/cm³

The ethylene polymer can be produced according to a conventional process, using a conventional polymerization catalyst.

Examples of the polymerization catalyst are a homogeneous catalyst system represented by a metallocene catalyst; a Ziegler catalyst system; and a Ziegler-Natta catalyst system. Examples of the homogeneous catalyst system are (1) a catalyst system comprising (1-1) a cyclopentadienyl ring-containing transition metal compound of Group 4 of the Periodic Table and (1-2) an alkylaluminoxane; (2) a catalyst system comprising (2-1) a cyclopentadienyl ring-containing transition metal compound of Group 4, (2-2) a compound which forms an ionic complex by reacting with the cyclopentadienyl ring-containing transition metal compound, and (2-3) an organoaluminum compound; and (3) a catalyst system obtained by a method comprising the steps of (3-1) supporting a catalyst component (such as a cyclopentadienyl ring-containing transition metal compound of Group 4, a compound which forms an ionic complex by reacting with the cyclopentadienyl ring-containing transition metal compound, and an organoaluminum compound) on inorganic particles such as silica and clay mineral, and (3-2) modifying the resultant supported material. Also, the polymerization catalyst may be a pre-polymerization catalyst prepared by pre-polymerizing ethylene or an α-olefin in the presence of the above catalyst system.

The ethylene polymer in the present invention may be a commercially-available ethylene polymer, such as ENGAGE (trademark of Dow Chemical Japan Ltd.), TAFMER (trademark of Mitsui Chemicals, Inc.), NEO-ZEX and ULT-ZEX (trademark of Prime polymer Co., Ltd.), and EXCELLEN FX, SUMIKATHENE, SUMIKATHENE-L, and ESPRENE SPO (trademark of Sumitomo Chemical Co., Ltd.).

Examples of $R^1$ to $R^{10}$ in formula (I) representing the metal salt are a methyl group, an ethyl group, a propyl group, a methoxy group, an ethoxy group, a methylamino group, an ethylamino group, a dimethylamino group, a diethylamino group, a fluorine atom, a chlorine atom, a bromine atom, and an iodine atom. Examples of the group represented by the formula, R—(R'—O)$_n$—, contained in formula (I) are as follows: $CH_3$—$(CH_2CH_2$—$O)$—, $CH_3(CH_2CH_2$—$O)_2$—, $CH_3(CH_2CH_2$—$O)_3$—, $CH_3(CH_2CH_2$—$O)_4$—, $C_2H_5$—$(CH_2CH_2$—$O)$—, $C_2H_5(CH_2CH_2$—$O)_2$—, $C_2H_5(CH_2CH_2$—$O)_3$—, $C_3H_7$—$(CH_2CH_2$—$)$—, $C_3H_7(CH_2CH_2$—$O)_2$—, $C_3H_7(CH_2CH_2$—$O)_3$—, $CH_3$—$(CH(CH_3)CH_2$—$O)$—, $CH_3(CH(CH_3)CH_2$—$O)_2$—, $C_2H_5$—$(CH(CH_3)CH_2$—$O)$—, and $C_2H_5(CH(CH_3)CH_2$—$O)_2$—.

$R^1$ to $R^{10}$ are independently of one another preferably a hydrogen atom or an alkyl group having 1 to 3 carbon atoms such as a methyl group, an ethyl group and a propyl group, and a more preferable metal salt is calcium 1,2-cyclohexanedicarboxylate represented by the following formula.

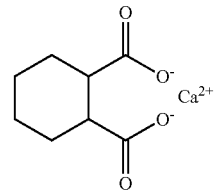 [SMILES: O=C([O-])C1CCCCC1C(=O)[O-] ; [Ca+2]]

Further examples of the metal salt represented by formula (I) are as follows:

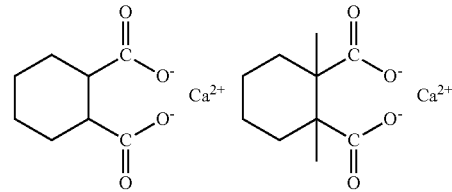

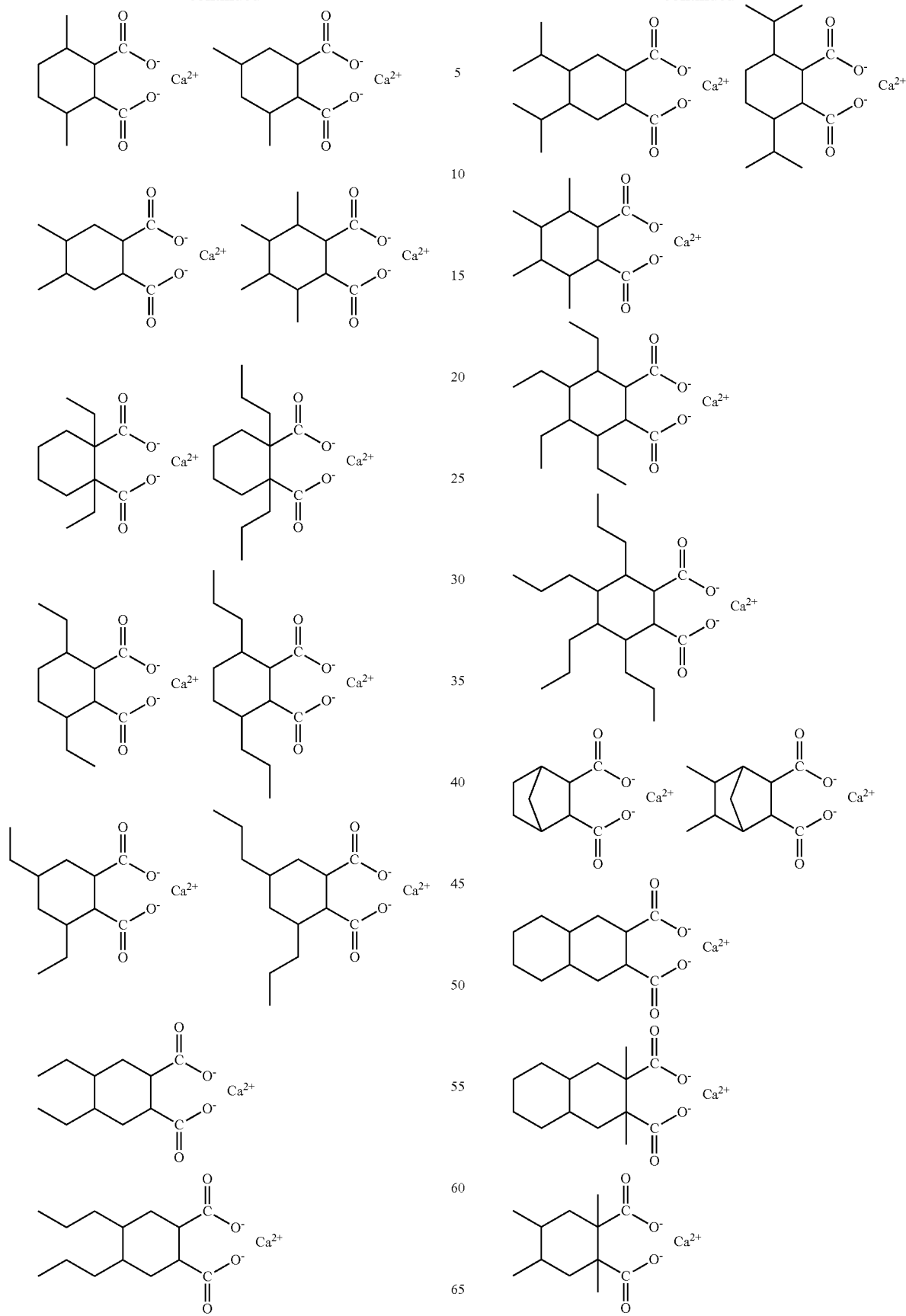

-continued

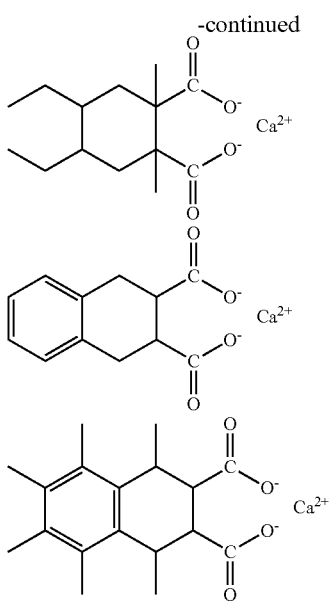

In order to improve dispersibility of the metal salt in the polypropylene resin composition of the present invention, the metal salt may be combined with a dispersing agent. Examples of the dispersing agent are an aliphatic acid such as an aliphatic acid having 10 to 24 carbon atoms; an alkyl ester of such an aliphatic acid; an alkali or alkaline-earth metal salt of such an aliphatic acid; alcohols having 10 to 30 carbon atoms; a polyalcohol; and an ester of such a polyalcohol. Among them, preferred is a metal salt of an aliphatic acid.

Examples of the alkali metal are sodium, potassium and lithium, and examples of the alkaline-earth metal are calcium, magnesium and zinc. Examples of the polyalcohol are glycerin, ethylene glycol, propylene glycol, pentaerythritol, dipentaerythritol, tripentaerythritol, and sorbitol.

The metal salt has preferably a particulate shape, which has an average particle diameter of usually 0.01 to 10 μm, preferably 0.01 to 5 μm, and further preferably 0.01 to 3 μm, measured with a laser diffraction type-particle size distribution measurement apparatus such as HELOS (trademark of Sympatec GmbH).

The metal salt can be produced by a process disclosed in a patent document such as JP 2004-525227A (corresponding to US 2003-27908A) and JP 2009-504842A (corresponding to US 2007-36960A). Above-mentioned metal salt, calcium 1,2-cyclohexanedicarboxylate, may be a commercially-available metal salt such as Hyperform HPN-20E (trademark of Milliken and Company), which contains 66% by weight of calcium 1,2-cyclohexanedicarboxylate as a principal component.

The resin composition of the present invention comprises 51 to 99% by weight, preferably 60 to 99% by weight, and more preferably 70 to 95% by weight of the propylene polymer, and 1 to 49% by weight, preferably 1 to 40% by weight, and more preferably 5 to 30% by weight of the ethylene polymer, provided that the total of the propylene polymer and the ethylene polymer is 100% by weight.

The resin composition of the present invention contains the metal salt in an amount of 0.001 to 0.5 part by weight, preferably 0.01 to 0.5 part by weight, and more preferably 0.05 to 0.3 part by weight, provided that the total of the propylene polymer and the ethylene polymer is 100 parts by weight.

The resin composition of the present invention has a melt flow rate of preferably 0.1 to 400 g/10 minutes, more preferably 0.5 to 300 g/10 minutes, and further preferably 1 to 200 g/10 minutes, measured at 230° C. under a load of 2.16 kg, from a viewpoint of moldability and processability of the polypropylene resin composition.

The resin composition of the present invention may contain additives known in the art, such as neutralizing agents, antioxidants, UV absorbers, light stabilizers, antistatic agents, lubricants, antiblocking agents, processing aids, organic peroxides, colorants, foaming agents, nucleating agents for cell forming, nucleating agents (excluding metal salts in the present invention), plasticizers, flame retardants, crosslinking agents, crosslinking aids, glittering materials, antibacterial agents, light-diffusing agents, inorganic fillers, anti-scratch agents, and a combination of two or more thereof. Among them, preferred are neutralizing agents, antioxidants, UV absorbers, light stabilizers, or colorants.

Examples of the neutralizing agents are metal salts of higher fatty acids (metal soap), hydrotalcite, oxides or hydroxides of alkaline earth metals, and a combination of two or more thereof.

The above higher fatty acids regarding the metal soap are preferably fatty acids having from 10 to 30 carbon atoms, and further preferably fatty acids having from 12 to 18. The metal of the metal soap is preferably calcium, sodium, magnesium, lithium, aluminum, or zinc, and more preferably calcium. Among them, preferred is calcium stearate as metal salts of higher fatty acids.

The above hydrotalcite is a natural or synthetic product, and its property such as a crystal structure, a crystal particle diameter, and a moisture content is suitably determined. It is permitted, if necessary, to use a surface-treated hydrotalcite.

Above hydrotalcite is preferably a compound represented by the following formula:

$$Mg_y Al_2(OH)_{2y+4} CO_3 \cdot m H_2 O$$

wherein Y is a number of 4 or more, and m is a positive number; and more preferably compounds represented by the following formulas:

$$Mg_{4.5} Al_2(OH)_{13} CO_3 \cdot 3 H_2 O,$$

$$Mg_{4.5} Al_2(OH)_{11}(CO_3)_{0.8} \cdot O_{0.2},$$

$$Mg_4 Al_2(OH)_{12} CO_3 \cdot 3 H_2 O,$$

$$Mg_5 Al_2(OH)_{14} CO_3 \cdot 4 H_2 O,$$

$$Mg_6 Al_2(OH)_{16} CO_3 \cdot 4 H_2 O$$

$$Zn_4 Al_2(OH)_{12} CO_3 \cdot m H_2 O \text{ (}m\text{ is a number between 0 and 4), or}$$

$$Mg_3 Zn Al_2(OH)_{12} CO_3 \cdot m H_2 O \text{ (}m\text{ is a number between 0 and 4).}$$

Examples of the above oxides or hydroxides of alkaline earth metals as the neutralizing agents are calcium oxide, magnesium oxide, calcium hydroxide, and magnesium hydroxide. Among them, preferred is calcium hydroxide.

The resin composition of the present invention may contain a neutralizing agent in amount of usually 0.001 to 0.5 part by weight, preferably 0.005 to 0.2 part by weight, and more preferably 0.01 to 0.2 part by weight, provided that the total of the propylene polymer and the ethylene polymer contained in the resin composition is 100 parts by weight.

Examples of the above antioxidants are phenolic antioxidants, phosphorus atom-containing antioxidants, sulfur atom-containing antioxidants, hydroxylamine, and metal deactivators. Among them, preferred are phenolic antioxidants, phosphorus atom-containing antioxidants, or sulfur atom-containing antioxidants.

Examples of the above phenolic antioxidants are tetrakis[methylene-3 (3',5'-di-tert-butyl-4-hydroxyphenyl) propionate]methane, octadecyl-3-(3,5-di-tert-butyl-4-hydroxyphenyl)propionate, 3,9-bis[2-{3-(3-tert-butyl-4-hydroxy-5-methylphenyl) propionyloxy}-1,1-dimethylethyl]-2,4,8,10-tetraoxaspiro[5.5]undecane, triethylene glycol-N-bis-3-(3-tert-butyl-5-methyl-4-hydroxyphenyl) propionate, 1,6-hexanediolbis[3-(3,5-di-tert-butyl-4-hydroxyphenyl) propionate], 2,2-thiobis-diethylenebis[3-(3,5-di-tert-butyl-4-hydroxyphenyl) propionate], and tocopherols. Among them, preferred is 3,9-bis[2-{3-(3-tert-butyl-4-hydroxy-5-methylphenyl) propionyloxy}-1,1-dimethylethyl]-2,4,8,10-tetraoxaspiro[5.5]undecane, from a viewpoint of hue stability of the resin composition of the present invention.

The resin composition of the present invention may contain such a phenolic antioxidant in amount of usually 0.01 to 2 parts by weight, preferably 0.01 to 1 part by weight, and more preferably 0.01 to 0.5 part by weight, provided that the total of the propylene polymer and the ethylene polymer contained in the resin composition is 100 parts by weight.

Examples of the above phosphorus atom-containing antioxidants are tris(2,4-di-tert-butylphenyl) phosphite, bis(2,4-di-tert-butylphenyl)pentaerythritol diphosphite, and 2,4,8,10-tetra-tert-butyl-6-[3-(3-methyl-4-hydroxy-5-tert-butylphenyl)propoxy]dibenzo[d,f][1,3,2]dioxaphosphepine, from a viewpoint of processing stability of the resin composition of the present invention.

The resin composition of the present invention may contain such a phosphorus atom-containing antioxidant in amount of usually 0.01 to 2 parts by weight, preferably 0.01 to 1 part by weight, and more preferably 0.01 to 0.5 part by weight, provided that the total of the propylene polymer and the ethylene polymer contained in the resin composition is 100 parts by weight.

Examples of the above sulfur atom-containing antioxidants are dimyristyl-3,3'-thiodipropionate, neopentan-tetrayltetrakis(3-laurylthiopropionate), and bis[2-methyl-4-(3-n-alkyl($C_{12}$-$C_{14}$)thiopropionyloxy)-5-tert-butylphenyl]sulfide, wherein "alkyl($C_{12}$-$C_{14}$)" means an alkyl group having 12 to 14 carbon atoms, from a viewpoint of a heat aging resistance of the resin composition of the present invention.

The resin composition of the present invention may contain such a sulfur atom-containing antioxidant in amount of usually 0.01 to 2 parts by weight, preferably 0.01 to 1 part by weight, and more preferably 0.01 to 0.5 part by weight, provided that the total of the propylene polymer and the ethylene polymer contained in the resin composition is 100 parts by weight.

Examples of the above UV absorbers are phenyl salicylate, 4-tert-butylphenyl salicylate, 2,4-di-tert-butylphenyl 3',5'-di-tert-butyl-4'-hydroxybenzoate, myristyl 3,5-di-tert-butyl-4-hydroxybenzoate, lauryl 3,5-di-tert-butyl-4-hydroxybenzoate, palmityl 3,5-di-tert-butyl-4-hydroxybenzoate, stearyl 3,5-di-tert-butyl-4-hydroxybenzoate, behenyl 3,5-di-tert-butyl-4-hydroxybenzoate, montanyl 3,5-di-tert-butyl-4-hydroxybenzoate, 4-tert-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-tert-octylphenyl)benzotriazole, 2-(2'-hydroxy-3'-tert-butyl-5'-methylphenyl)-5-chloroben Zotriazole, 2-(3'-sec-butyl-2'-hydroxy-5'-tert-butylphenyl)benzotriazole, 2-(2'-hydroxy-4'-octyloxyphenyl)benzotriazole, 2-(3',5'-di-tert-amyl-2'-hydroxyphenyl)benzotriazole and 2-[2'-hydroxy-3',5'-bis(α,α-dimethylbenzyl)phenyl]-2H-benzotriazole. Among them, preferred is 2,4-di-tert-butylphenyl 3',5'-di-tert-butyl-4'-hydroxybenzoate, lauryl 3,5-di-tert-butyl-4-hydroxybenzoate, palmityl 3,5-di-tert-butyl-4-hydroxybenzoate, stearyl 3,5-di-tert-butyl-4-hydroxybenzoate, or behenyl 3,5-di-tert-butyl-4-hydroxybenzoate, in order to obtain the resin composition of the present invention excellent in its hue.

Examples of the above light stabilizers are low molecular weight-light stabilizers and oligomer type-high molecular weight-light stabilizers. Specific examples thereof are bis(2,2,6,6-tetramethyl-4-piperidyl) sebacate; a mixture containing bis(1,2,2,6,6-pentamethyl-4-piperidyl) sebacate and methyl 1,2,2,6,6-pentamethyl-4-piperidyl sebacate; bis(1,2,2,6,6-pentamethyl-4-piperidyl) [[3,5-bis(1,1-dimethylethyl)-4-hydroxyphenyl]methyl]butyl malonate; a reaction product of bis(2,2,6,6-tetramethyl-1(octyloxy)-4-piperidyl) decanedioate, 1,1-dimethylethyl hydroperoxide, and octane; 4-benzoyloxy-2,2,6-6-tetramethylpiperidine; a mixed ester prepared from 2,2,6,6-tetramethyl-4-piperidinol and a higher fatty acid; tetrakis(2,2,6,6-tetramethyl-4-piperidyl) 1,2,3,4-butanetetracarboxylate; tetrakis(1,2,2,6,6-pentamethyl-4-piperidyl) 1,2,3,4-butanetetracarboxylate; a polycondensate of dimethyl succinate with 4-hydroxy-2,2,6,6-tetramethyl-1-piperidine ethanol; poly[{6-(1,1,3,3-tetramethylbutyl)amino-1,3,5-triazin-2,4-diyl}{(2,2,6,6-tetramethyl-4-piperidyl) imino}hexamethylene{(2,2,6,6-tetramethyl-4-piperidyl) imino}]; a polycondensate of dibutylamine.1,3,5-triazine.N,N'-bis(2,2,6,6-tetramethyl-4-piperidyl-1,6-hexamethylenediamine with N-(2,2,6,6-tetramethyl-4-piperidyl)butylamine; N,N',N'',N'''-tetrakis(4,6-bis(butyl-(N-methyl-2,2,6,6-tetramethylpiperidin-4-yl)amino)triazin-2-yl)-4,7-diazadecane-1,10-diamine; and mixed {1,2,2,6,6-pentamethyl-4-piperidyl/β,β,β',β'-tetramethyl-3,9-[2,4,8,10-tetraoxaspiro(5,5)undecane]diethyl}-1,2,3,4-butanetetracarboxylate. Among them, in order to obtain the resin composition of the present invention excellent in its light stability, preferred is bis(2,2,6,6-tetramethyl-4-piperidyl)sebacate; a reaction product of bis(2,2,6,6-tetramethyl-1(octyloxy)-4-piperidyl)decanedioate, 1,1-dimethylethyl hydroperoxide, and octane; tetrakis(2,2,6,6-tetramethyl-4-piperidyl)1,2,3,4-butanetetracarboxylate; tetrakis(1,2,2,6,6-pentamethyl-4-piperidyl)1,2,3,4-butanetetracarboxylate; polycondensates of dimethyl succinate with 4-hydroxy-2,2,6,6-tetramethyl-1-piperidine ethanol; or poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}].

The resin composition of the present invention may contain such a light stabilizer in amount of usually 0.01 to 2 parts by weight, preferably 0.01 to 1 part by weight, and more preferably 0.01 to 0.5 part by weight, provided that the total of the propylene polymer and the ethylene polymer contained in the resin composition is 100 parts by weight.

Examples of the above colorants are inorganic pigments such as iron oxide, titanium oxide, zinc oxide, burnt ocher, cadmium red, cadmium yellow, permanent blue, cobalt blue, titanium yellow, white lead, red lead, lead yellow, Berlin blue, and a combination of two or more thereof; organic pigments such as quinacridon, polyazo yellow, anthraquinon yellow, polyazo red, azo lake yellow, perylene, phthalocyanine green, phthalocyanine blue, isoindolinone yellow, and a combination of two or more thereof; and a combination of one or more of those inorganic pigments with one or more of those organic pigments. Those pigments may be combined with a pigment dispersing agent, in order to sufficiently disperse the pigments in the resin composition of the present invention.

The resin composition of the present invention may contain a rubber and/or other resin than the propylene resin and the ethylene resin in the present invention. Examples of the rubber and the other resin are a polymer containing a polymerization unit of styrene and/or its derivative such as polystyrene, poly(p-methylstyrene), and poly(α-methylstyrene); acrylonitrile/styrene copolymer (AS resin); acrylonitrile/butadiene/styrene copolymer (ABS resin); special acrylic rubber/acrylonitrile/styrene copolymer (AAS resin); acrylonitrile/chlorinated polyethylene/styrene copolymer (ACS resin); polychloroprene; chlorinated rubber; polyvinyl chloride; polyvinylidene chloride; acrylic resin; ethylene/vinyl alcohol copolymer resin; fluororesin; polyacetal; grafted polyphenylene ether resin; grafted polyphenylene sulfide resin; polyurethane; polyamide; polyester resin such as polyethylene terephthalate and polybutylene terephthalate; polycarbonate; polysulfone; polyether ether ketone; polyether sulfone; aromatic polyester resins; epoxy resin; dially phthalate prepolymer; silicone resin; silicone rubber; polybutadiene; 1,2-polybutadiene; polyisoprene; styrene/butadiene copolymer; butadiene/acrylonitrile copolymer; epichlorohydrin rubber; acrylic rubber; natural rubber.

Also, the resin composition of the present invention may contain a polymer such as polylactic acid (PLA resin) produced by polymerizing a monomer extracted from a plant.

The resin composition of the present invention can be produced by melt kneading the propylene resin, the ethylene resin, the metal salt, and the above optional component with one another, at 180° C. or higher, preferably 180 to 300° C., and more preferably 180 to 250° C., using a melt kneading apparatus known in the art such as a melt extruder and a Banbury mixer. From a viewpoint of impact resistance and appearance of a molded article comprising the resin composition of the present invention, such as a film, sheet and injection-molded article, it is preferable that the molded article contains few fish eyes, which are a point-like projection or hollow. In order to obtain a molded article containing few fish eyes, a melt kneaded mixture obtained by the above melt kneading is preferably filtered, thereby removing causative materials for fish eyes formed by insufficient dispersion of the propylene resin, the ethylene resin and the metal salt in the resin composition. A filtration rate of the melt kneaded mixture, per unit time or per unit area of a filter, can be determined arbitrarily, as long as its filtration efficiency does not become less efficient. The filtration is carried out in a single-stage or multistage manner, and plural filters in the latter manner are arranged in series, parallel or in combination thereof to a flow of the melt kneaded mixture.

Examples of a method for mixing the metal salt with the propylene resin, the ethylene resin and the above optional component are as follows:

(1) a method comprising the steps of (i) mixing a necessary amount of the propylene polymer with a necessary amount of the ethylene polymer, thereby making a mixture, and then (ii) mixing the mixture with a necessary amount of the metal salt;

(2) a method comprising the steps of (i) mixing 100 parts by weight of the propylene polymer, or 100 parts by weight of the ethylene polymer, or 100 parts by weight of a mixture consisting of the propylene polymer and the ethylene polymer, with the metal salt in an amount of 1 to 100 parts by weight, preferably 1 to 50 parts by weight, and more preferably 5 to 30 parts by weight, thereby making a mixture (master batch), and then (ii) mixing a given amount of the master batch with another mixture consisting of a given amount of the propylene polymer and a given amount of the ethylene polymer; and (3) a method comprising the steps of (i) mixing 100 parts by weight of the above optional component with the metal salt in an amount of 10 to 900 parts by weight, preferably 10 to 500 parts by weight, and more preferably 20 to 200 parts by weight, thereby making a mixture, (ii) solidifying the mixture in a granular state, thereby making granular particles, and then (iii) mixing a given amount of the granular particles with a mixture consisting of a given amount of the propylene polymer and a given amount of the ethylene polymer.

Among them, method (2) using a master batch can produce a polypropylene resin composition extremely excellent in a balance between its tensile strength and impact resistance. The above "necessary amount" means an amount corresponding to the amount prescribed in the present invention, and the above "given amount" means an amount such that an amount of a component contained in a finally-obtained mixture satisfies the amount prescribed in the present invention.

Examples of the above-mentioned melt kneading apparatus known in the art are a single screw extruder; a co-rotating twin screw extruder such as ZSK (trademark of Wernw Pfleideren), TEM (trademark of Toshiba Machine Co., Ltd.), TEX (trademark of The Japan Steel Works, Ltd.), and KZW (trademark of Technovel Corporation); and a counter-rotating twin screw extruder such as CMP (trademark of The Japan Steel Works, Ltd.), FCM (trademark of Kobe Steel, Ltd.), NCM (trademark thereof), and LCM (trademark thereof).

Examples of a shape of the resin composition of the present invention are a strand, a sheet, a flat plate, and a pellet obtained by cutting the strand into a suitable length. Among them, preferred is a 1 to 50 mm-long pellet, from a viewpoint of a stable production of a molded article from the resin composition.

Examples of a molding method of the resin composition of the present invention are an injection molding method, a press molding method, a vacuum molding method, an expansion molding method, and an extrusion molding method. Further examples thereof are a method of laminating the resin composition of the present invention with other resin, and a method of co-extruding the resin composition of the present invention with other resin. A molded article from the resin composition of the present invention is preferably an injection molded article obtained by the above-mentioned injection molding method. Examples of the injection molding method are a conventional injection molding method, an injection foam molding method, a supercritical injection foam molding method, a ultrahigh speed injection molding method, an injection compression molding method, a gas-assist injection molding method, a sandwich molding method, a sandwich foam molding method, and an insert•outsert molding method.

Examples of a use of the resin composition of the present invention are automotive components, home electrical components, monitoring components, OA equipment components, medical materials, drain pans, toiletry supplies, bottles, containers, sheets, films, and building materials. Examples of the automotive components are interior components such as door trims, pillars, instrument panels, consoles, locker panels, arm rests, door panels, and spare tire cover; exterior components such as bumpers, spoilers, fenders, and side steps; other components such as air-intake ducts, coolant reserve tanks, fender liners, fans, and underdeflectors; and integrated components such as front end panels. Examples of home electrical components are components of clothes washers such as an outer tank, an inner tank, a cover, a pulsator, and a balancer; drying machine components; vacuum cleaner components; rice cooker components; electric pot components; heat insulator components; dish washer components; and air cleaner components.

Example

The present invention is explained in more detail with reference to the following Example, which does not limit the present invention. The following components and property-measurement methods were used.
I. Component
1. Propylene Polymer (A)
(A-1)
(i) Propylene-ethylene random copolymer (pellet), produced by pelletizing after-mentioned powder polymer (A-3).
(ii) SUMITOMO NOBLENE H501N (trademark of Sumitomo Chemical Co., Ltd.)
(iii) Melt flow rate: 3 g/10 minutes measured at 230° C. under a load of 2.16 kg.
(iv) Ethylene unit content: 0.6% by weight (total of said copolymer=100% by weight).
(v) Intrinsic viscosity ([η]): 2.0 dl/g.
(vi) Melting temperature: 160° C.
(A-2)
(i) (Propylene)-(propylene-ethylene) polymer produced in after-mentioned Example 4, which consists of polymer components (I) and (II), component (I) being propylene homopolymer produced in step (I), and component (II) being propylene-ethylene copolymer produced in step (II), by use of a polymerization catalyst produced by a method disclosed in Example 1 of JP 2004-182981A.
(ii) Melt flow rate: 26 g/10 minutes measured at 230° C. under a load of 2.16 kg.
(iii) Ethylene unit content in propylene polymer (A-2): 7.4% by weight (total of said polymer=100% by weight).
(iv) Intrinsic viscosity of said polymer, $[\eta]_{Total}$: 1.4 dl/g.
(v) Intrinsic viscosity of polymer component (I), $[\eta]_I$: 1.07 dl/g.
(vi) Isotactic pentad fraction of polymer component (I): 0.983.
(vii) Intrinsic viscosity of polymer component (II), $[\eta]_{II}$: 2.7 dl/g.
(viii) Content of polymer component (II): 20% by weight (total of propylene polymer (A-2)=100% by weight).
(ix) Ethylene unit content in polymer component (II): 37% by weight (total of polymer component (II)=100% by weight).
(X) $[\eta]_{II}/[\eta]_I$: 2.52.
(A-3)
(i) Powder polymer corresponding to above-mentioned pelletized polymer (A-1).
(A-4)
(i) A propylene homopolymer produced in after-mentioned Example 11 by a process comprising former liquid-phase polymerization step (I), and latter gas-phase polymerization step (II), by use of a polymerization catalyst produced by a method disclosed in Example 1 of JP 2004-182981A.
(ii) Melt flow rate: 8.0 g/10 minutes measured at 230° C. under a load of 2.16 kg.
(iii) Intrinsic viscosity ([η]): 1.61 dl/g.
(iv) Isotactic pentad fraction: 0.981.
(v) Melting temperature: 163° C.
(A-5)
(i) A propylene-ethylene random copolymer produced in after-mentioned Example 13 by a process comprising former liquid-phase polymerization step (I), and latter gas-phase polymerization step (II), by use of a polymerization catalyst produced by a method disclosed in Example 1 of JP 2004-182981A.
(ii) Melt flow rate: 6.0 g/10 minutes measured at 230° C. under a load of 2.16 kg.
(iii) Ethylene unit content: 3.7% by weight (5.4% by mol).
(iv) Intrinsic viscosity ([η]): 1.65 dl/g.
(v) Melting temperature: 141° C.
2. Ethylene polymer (B)
(B-1)
(i) Ethylene-1-butene copolymer, referred to as linear low-density polyethylene (LLDPE).
(ii) EXCELLEN CN3009 (trademark of Sumitomo Chemical Co., Ltd.)
(iii) Density: 0.90 g/cm³.
(iv) Melt flow rate: 5 g/10 minutes measured at 190° C. under a load of 2.16 kg.
(v) 1-Butene unit content: 21.8% by weight (8.5% by mol).
(vi) Melting temperature: 86.2° C. (first peak temperature), and 113.4° C. (second peak temperature).
(B-2)
(i) Ethylene-1-octene copolymer elastomer.
(ii) ENGAGE EG8100 (trademark of Dow AgroSciences LLC.)
(iii) Density: 0.87 g/cm³.
(iv) Melt flow rate: 1 g/10 minutes measured at 190° C. under a load of 2.16 kg.
(v) 1-Octene unit content: 34.0% by weight (11.4% by mol).
(vi) Melting temperature: 50.5° C.
(B-3)
(i) Ethylene-1-octene copolymer elastomer.
(ii) ENGAGE EG8200 (trademark of Dow AgroSciences LLC.)
(iii) Density: 0.87 g/cm³.
(iv) Melt flow rate: 5 g/10 minutes measured at 190° C. under a load of 2.16 kg.
(v) 1-Octene unit content: 34.6% by weight (11.7% by mol).
(vi) Melting temperature: 46.9° C. (first peak temperature), and 59.5° C. (second peak temperature).
(B-4)
(i) Ethylene-1-octene copolymer elastomer.
(ii) ENGAGE EG8450 (trademark of Dow AgroSciences LLC.)
(iii) Density: 0.87 g/cm³.
(iv) Melt flow rate: 3 g/10 minutes measured at 190° C. under a load of 2.16 kg.
(v) 1-Octene unit content: 16.2% by weight (4.6% by mol).
(vi) Melting temperature: 98.5° C.
(B-5)
(i) Ethylene-1-butene copolymer elastomer.
(ii) TAFMER A1050S (trademark of Mitsui Chemicals, Inc.)
(iii) Density: 0.864 g/cm³.
(iv) Melt flow rate: 1.4 g/10 minutes measured at 190° C. under a load of 2.16 kg.
(v) 1-Butene unit content: 31.8% by weight (18.9% by mol).
(vi) Melting temperature: primary peak temperature 5.7° C., and secondary peak temperature 38.0° C.
(B-6)
(i) High density polyethylene (HDPE).
(ii) G1900 (trademark of Keiyo Polyethylene Co., Ltd.)
(iii) Density: 0.955 g/cm³.
(iv) Melt flow rate: 16 g/10 minutes measured at 190° C. under a load of 2.16 kg.
(v) Propylene unit content: 1.05% by weight (0.7% by mol).
(vi) Melting temperature: 131° C.

(B-7)
(i) Low density polyethylene (LDPE).
(ii) SUMIKATHENE G801 (trademark of Sumitomo Chemical Co., Ltd.)
(iii) Density: 0.919 g/cm³.
(iv) Melt flow rate: 20 g/10 minutes measured at 190° C. under a load of 2.16 kg.
(vi) Melting temperature: 106° C.
(B-8)
(i) Linear low density polyethylene (L-LDPE).
(ii) SUMIKATHENE-L GA801 (trademark of Sumitomo Chemical Co., Ltd.)
(iii) Density: 0.920 g/cm³.
(iv) Melt flow rate: 20 g/10 minutes measured at 190° C. under a load of 2.16 kg.
(vi) 1-Butene unit content: 8.6% by weight I (4.5% by mol).
3. Metal Salt (C)
(C-1)
(i) Principal component: calcium 1,2-cyclohexanedicarboxylate represented by following formula:

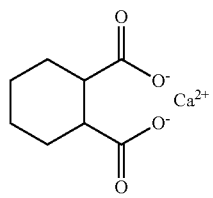 [SMILES: O=C([O-])C1CCCCC1C(=O)[O-] ; [Ca+2]]

(ii) Hyperform HPN-20E (trademark of Milliken and Company) (particle shape)
(iii) CAS Reg. NO.: 491589-22-1
(iv) Content of principal component (purity): 66% by weight
(v) Average particle diameter of principal component contained in Hyperform HPN-20E: 2.6 μm, measured with laser diffraction type-particle size distribution measurement apparatus, HELOS (trademark of Sympatec GmbH).
(vi) Accessory component: zinc stearate
(vii) CAS Reg. NO. of accessory component: 557-05-1
(viii) Content of accessory component: 34% by weight
(C-2) (for comparison)
(i) Principal component: disodium (1R,2R,3S,4S)-bicyclo[2.2.1]heptane-2,3-dicarboxylate represented by following formula:

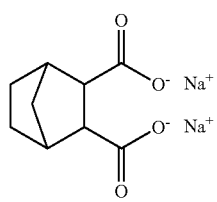 [SMILES: O=C([O-])C1C2CCC(C2)C1C(=O)[O-] ; [Na+] ; [Na+]]

(ii) Hyperform HPN-68L (trademark of Milliken and Company)
(iii) Content of principal component (purity): 80% by weight
(C-3) (for comparison)
(i) Aluminum hydroxyl-di-(p-tert-butylbenzoate)
(ii) AL-PTBBA (trademark of Kyodo Chemical Co. Ltd.)
(C-4) (for comparison)
(i) Sodium 2,2'-methylene-bis-(4,6-di-tert-butylphenyl)phosphate
(ii) ADEKASTAB NA-11 (trademark of ADEKA Corporation)
(C-5) (for comparison)
(i) Aluminum[2,2'-methylene-bis-(4,6-di-tert-butylphenyl)phosphate
(ii) ADEKASTAB NA-21 (trademark of ADEKA Corporation)
(C-6) (for comparison)
(i) Nonitol,1,2,3-trideoxy-4,6:5,7-bis-O-[(4-propylphenyl)methylene]- (registered name of FDA) 1,2,3-trideoxy-4,6:5,7-bis-O-[(4-propylphenyl)methylene]-nonitol (name used in Milliken technical documents)
(ii) Millad NX8000J (trademark of Milliken and Company)
(iii) CAS Reg. NO.: 882073-43-0
4. Additive
(D-1): Neutralizing agent
(i) Calcium stearate manufacture by Kyodo Chemical Co. Ltd.
(D-2): Antioxidant
(i) 3,9-Bis[2-(3-(3-tert-butyl-4-hydroxy-5-methylphenyl)propionyloxy)-1,1-dimethylethyl]-2,4,8,10-tetraoxaspiro[5.5]undecane
(ii) Sumilizer GA80 (trademark of Sumitomo Chemical Co., Ltd.)
(D-3): Antioxidant
(i) Bis(2,4-di-tert-butylphenyl)pentaerythritoldiphosphite
(ii) SONGNOX6260 (trademark of Songwon Japan K.K.)
(D-4): Neutralizing agent
(i) Hydrotalcite DHT4C (trademark of Kyowa Chemical Industry Co., Ltd.)
(D-5): Antioxidant
(i) 6-[3-(3-t-butyl-4-hydroxy-5-methylphenyl)propoxy]-2,4,8,10-tetra-t-butyldibenz[d,f][1,3,2]dioxaphosphepin
(ii) Sumilizer GP (trademark of Sumitomo Chemical Co., Ltd.)
(iii) CAS Reg. NO.: 203255-81-6
II. Property Measurement
1. Melt Flow Rate (MFR: g/10 Minutes)
It was measured according to a method prescribed in JIS-K-6758 (JIS-K-7210-1999), at 190° C. in case of ethylene polymer, and at 230° C. in case of propylene polymer or polypropylene resin composition, under a load of 2.16 kg, JIS being Japanese Industrial Standards.
2. Density (g/cm³)
It was measured according to a method prescribed in JIS-K6760-1981 (JIS-K7112-1999).
3. Melting Temperature (° C.)
It was measured according to a method prescribed in JIS-K-7121-1987, using differential scanning calorimetry (DSC), by the following method comprising the steps of:
(1) melting a sample completely at higher temperature by 50° C. or more than its melting temperature;
(2) cooling down the sample to lower temperature than its crystallization temperature (to 23° C. in case of propylene polymer, and to −20° C. incase of ethylene polymer), at a cooling rate of 5° C./minute;
(3) heating the sample at a heating rate of 5° C./minute, thereby obtaining an endothermic curve; and
(4) considering a peak temperature in the endothermic curve as a melting temperature of the sample.
4. Intrinsic Viscosity (dl/g)
It was measured by a method (extrapolation method) comprising the steps of:
(1) measuring reduced viscosities of three tetralin solutions having concentrations of 0.1 g/dl, 0.2 g/dl and 0.5 g/dl, respectively, at 135° C. with an Ubbellohde viscometer;

(2) plotting the above-obtained reduced viscosities for those concentrations, respectively; and (3) extrapolating the concentration to zero, thereby obtaining an intrinsic viscosity.

The extrapolation method is disclosed in "Kobunshi Yoeki, Kobunshi Jikkengaku 11" (published by Kyoritsu Shuppan Co. Ltd. in 1982), page 491.

An intrinsic viscosity of polymer component (II), $[\eta]_{II}$, is calculated from the following formula:

$$[\eta]_{II} = [\eta]_{Total} - [\eta]_I \times X_I)/X_{II}$$

wherein $[\eta]_{Total}$ is an intrinsic viscosity of the polymer comprising polymer components (I) and (II); $[\eta]_I$ is an intrinsic viscosity of polymer component (I) taken out from a polymerization reactor in step (I); and $X_I$ and $X_{II}$ are a proportion by weight of polymer components (I) and (II) contained in the polymer, respectively, and are obtained based on a material balance in the production of the polymer.

5. Ethylene Unit Content and α-Olefin Unit Content (% by Weight)

A content of an ethylene unit or α-olefin unit (for example, 1-butene unit and 1-octene unit) contained in the propylene polymer or the ethylene polymer was measured by a C-nuclear magnetic resonance method ($^{13}$C-NMR method) disclosed in "Kobunshi Bunseki Handbook (New Edition)" edited by Chemical Society of Japan and Polymer Analysis Research Society, published by Kinokuniya Co., Ltd. (1995). In order to determine an α-olefin unit content in the ethylene polymer, peaks in $^{13}$C-NMR spectrum of the ethylene polymer were assigned with reference to James C. Randall, J. Macromol. Sci., Rev. Macromol. Chem. Phs., C29 (2 & 3), 29, 201-317 (1989).

6. Ethylene Unit Content in Polymer Component (II) (% by Weight)

An ethylene unit content in polymer component (II) of above propylene polymer (A-2) was determined based on:
   the proportion by weight of polymer components (I) and (II) (namely, $X_I$ and $X_{II}$); and
   a content of an ethylene unit in propylene polymer (A-2), obtained by the following method comprising the steps of:

(1) dissolving homogeneously about 200 mg of the propylene polymer (A-2) in 3 mL of a mixed solvent consisting of 4 parts by volume of o-dichlorobenzene and 1 part by volume of o-dichlorobenzene-d$_1$, in a 10 mm-φ test tube;

(2) obtaining a $^{13}$C-NMR spectrum of the resultant solution under the following conditions; and

| | |
|---|---|
| NMR apparatus | JNM-EX270 (trademark of JEOL LTD), |
| measurement temperature | 135° C., |
| pulse repetition time | 10 seconds, |
| pulse width | 45°, and |
| cumulated number | 2,500 times, |

(3) obtaining a content of an ethylene unit content from the $^{13}$C-NMR spectrum, based on the report disclosed in Kakugo, et al. Macromolecules, volume 15, pages 1150-1152 (1982).

7. Isotactic Pentad Fraction (mmmm Fraction)

It was determined by calculating a ratio of an mmmm peak area to an all peak area of carbon atoms of methyl groups in a $^{13}$C-NMR spectrum measured with an NMR apparatus, AM400 (trademark of Bruker Corporation), wherein those peaks were assigned based on Macromolecules, volume 8, page 687 (1975).

8. Tensile Yield Strength (MPa)

It was measured by a method comprising the steps of:
   injection molding a sample with an injection molding machine, TOYO SI30III (trademark of Toyo Machinery & Metal Co., Ltd.) at molding temperature of 230° C. and mold temperature of 50° C., thereby obtaining a 2 mm-thick test piece; and
   subjecting the test piece to a tensile test at a tensile rate of 50 mm/minute and at 23° C., according to a method prescribed in ASTM D638.

9. Izod Impact Strength (kJ/m$^2$)

It was measured by a method comprising the steps of:
   injection molding similarly to the first step in above Section 8, thereby obtaining a 4 mm-thick test piece;
   notching the test piece, thereby obtaining a 4 mm-thick notched test piece; and
   subjecting the notched test piece to an impact test at 23° C. or −20° C., according to a method prescribed in JIS-K-7110.

Example 1

There were mixed 87 parts by weight of propylene polymer (A-1), 3 parts by weight of propylene polymer (A-3), 10 parts by weight of ethylene polymer (B-1), and 0.3 part by weight of metal salt (C-1) (amount of its principal component=0.3 (part by weight)×66 (% by weight)=0.2 part by weight) with one another, in a tumble mixer for 5 minutes at room temperature.

The resultant mixture was melt kneaded with a single screw extruder having an inner diameter of 40 mm, manufactured by Tanabe Plastics Machinery Co., Ltd., at 220° C. (cylinder temperature) at a screw rotation speed of 100 rpm, and an extrusion rate of about 16 kg/hour. The melt kneaded mixture was found to have temperature of 220 to 230° C. The melt kneaded mixture was filtered with a woven metal 50 mesh-filter having a filter precision of 410 μm (referred to hereinafter as "Filter A"), which was placed inside a die attached to the downstream end of the cylinder, then was extruded out of three outlets (diameter: 3 mm) of the die, then was cooled with cold water to form a solidified strand, and then was cut into pellets comprising a polypropylene resin composition.

The pellets were found to have a melt flow rate of 4.6 g/10 minutes, tensile yield strength of 33 MPa, and Izod impact strength of 7.7 kJ/m$^2$ (23° C.) and 1.6 kJ/m$^2$ (−20° C.) Results are shown in Table 1.

Comparative Example 1

Example 1 was repeated except that metal salt (C-1) was changed to metal salt (C-5), thereby obtaining pellets. The pellets were found to have a melt flow rate of 4.4 g/10 minutes, tensile yield strength of 34 MPa, and Izod impact strength of 5.2 kJ/m$^2$ (23° C.) and 1.5 kJ/m$^2$ (−20° C.). Results are shown in Table 1.

Comparative Example 2

Example 1 was repeated except that metal salt (C-1) was not used, thereby obtaining pellets. The pellets were found to have a melt flow rate of 3.9 g/10 minutes, tensile yield strength of 33 MPa, and Izod impact strength of 4.8 kJ/m$^2$ (23° C.) and 1.5 kJ/m$^2$ (−20° C.). Results are shown in Table 1.

Reference Example 1

There were melt kneaded 90 parts by weight of propylene polymer (A-3), 10 parts by weight of metal salt (C-1) (amount of its principal component=10 (parts by weight)×66 (% by weight)=6.6 parts by weight), 0.03 part by weight of additive (D-4), and 0.3 part by weight of additive (D-5), by use of a 100 mL batch-type LABO PLASTOMILL manufactured by Toyo Seiki Seisaku-sho, Ltd., under a nitrogen atmosphere at 200° (cylinder temperature) for 5 minutes at a rotor rotation speed of 50 rpm, thereby obtaining 70 g of a master batch (referred to hereinafter as "MB-1"). MB-1 was found to contain the principal component of metal salt (C-1) in an amount of 6.6% by weight, provided that the total of MB-1 was 100% by weight. Table 2 shows a composition of MB-1.

Reference Example 2

Reference Example 1 was repeated except that 90 parts by weight of propylene polymer (A-3) was changed to 90 parts by weight of ethylene (B-1), thereby obtaining a master batch (referred to hereinafter as "MB-2"). Table 2 shows a composition of MB-2.

Reference Example 3

Reference Example 1 was repeated except that 10 parts by weight of metal salt (C-1) was changed to 10 parts by weight of metal salt (C-5), thereby obtaining a master batch (referred to hereinafter as "MB-3"). Table 2 shows a composition of MB-3.

Reference Example 4

Reference Example 1 was repeated except that (i) 90 parts by weight of propylene polymer (A-3) was changed to 90 parts by weight of ethylene (B-1), (ii) and 10 parts by weight of metal salt (C-1) was changed to 10 parts by weight of metal salt (C-5), thereby obtaining a master batch (referred to hereinafter as "MB-4"). Table 2 shows a composition of MB-4.

Reference Example 5

Reference Example 1 was repeated except that (i) 90 parts by weight of propylene polymer (A-3) was changed to 90 parts by weight of ethylene (B-1), (ii) and 10 parts by weight of metal salt (C-1) was changed to 10 parts by weight of metal salt (C-6), thereby obtaining a master batch (referred to hereinafter as "MB-5"). Table 2 shows a composition of MB-5.

Example 2

A mixture of 87 parts by weight of propylene polymer (A-1), 10 parts by weight of ethylene polymer (B-1), and 3 parts by weight of MB-1 in a pellet form was treated similarly to Example 1, thereby obtaining pellets comprising a polypropylene resin composition. The polypropylene resin composition was the same as that obtained in Example 1 in its component composition, that is, the polypropylene resin composition comprising 87 parts by weight of propylene polymer (A-1), 3 parts by weight of propylene polymer (A-3), 10 parts by weight of ethylene polymer (B-1), and 0.3 part by weight of metal salt (C-1) (amount of its principal component=0.3 (part by weight)×66 (% by weight)=0.2 part by weight).

The pellets were found to have a melt flow rate of 4.7 g/10 minutes, tensile yield strength of 34 MPa, and Izod impact strength of 12.6 kJ/m² (23° C.) and 1.6 kJ/m² (−20° C.) Results are shown in Table 3.

Example 3

Example 2 was repeated except that 3 parts by weight of MB-1 was changed to 3 parts by weight of MB-2, thereby obtaining pellets comprising a polypropylene resin composition. The polypropylene resin composition contained 87 parts by weight of propylene polymer (A-1), 13 parts by weight of ethylene polymer (B-1), and 0.3 part by weight of metal salt (C-1) (amount of its principal component=0.3 (part by weight)×66 (% by weight)=0.2 part by weight).

The pellets were found to have a melt flow rate of 4.6 g/10 minutes, tensile yield strength of 32 MPa, and Izod impact strength of 14.1 kJ/m² (23° C.) and 1.5 kJ/m² (−20° C.). Results are shown in Table 3.

Comparative Example 3

Example 2 was repeated except that 3 parts by weight of MB-1 was changed to 3 parts by weight of MB-3, thereby obtaining pellets comprising a polypropylene resin composition. The polypropylene resin composition contained 87 parts by weight of propylene polymer (A-1), 3 parts by weight of propylene polymer (A-3), 10 parts by weight of ethylene polymer (B-1), and 0.3 part by weight of metal salt (C-5).

The pellets were found to have a melt flow rate of 4.1 g/10 minutes, tensile yield strength of 35 MPa, and Izod impact strength of 7.8 kJ/m² (23° C.) and 1.5 kJ/m² (−20° C.) Results are shown in Table 3.

Comparative Example 4

Example 2 was repeated except that 3 parts by weight of MB-1 was changed to 3 parts by weight of MB-4, thereby obtaining pellets comprising a polypropylene resin composition. The polypropylene resin composition contained 87 parts by weight of propylene polymer (A-1), 13 parts by weight of ethylene polymer (B-1), and 0.3 part by weight of metal salt (C-5).

The pellets were found to have a melt flow rate of 4.4 g/10 minutes, tensile yield strength of 35 MPa, and Izod impact strength of 9.3 kJ/m² (23° C.) and 1.5 kJ/m² (−20° C.) Results are shown in Table 3.

Comparative Example 5

Example 2 was repeated except that 3 parts by weight of MB-1 was changed to 3 parts by weight of MB-5, thereby obtaining pellets comprising a polypropylene resin composition. The polypropylene resin composition contained 87 parts by weight of propylene polymer (A-1), 13 parts by weight of ethylene polymer (B-1), and 0.3 part by weight of metal salt (C-6).

The pellets were found to have a melt flow rate of 4.5 g/10 minutes, tensile yield strength of 34 MPa, and Izod impact strength of 6.1 kJ/m² (23° C.) and 1.4 kJ/m² (−20° C.) Results are shown in Table 3.

Example 4

1. Production of Propylene Polymer (A-2)

(1) Step (I)

A loop type liquid-phase polymerization reactor made of stainless used steel was purged thoroughly with propylene. To the reactor were supplied continuously cyclohexylethyldimethoxysilane and triethylaluminum in a molar ratio of cyclohexylethyldimethoxysilane/triethylaluminum=0.15.

While adjusting inner temperature of the reactor to 65 to 75° C., and feeding propylene (continuously) and hydrogen to the reactor so as to adjust inner pressure (gauge pressure) of the reactor to 4.5 MPa, there was supplied continuously a solid catalyst component produced by a method disclosed in Example 1 of JP 2004-182981A to the reactor, thereby polymerizing propylene in a liquid phase. Then, all of the resultant propylene homopolymer was transferred to a first vessel mentioned below.

While feeding propylene continuously to the first vessel so as to keep polymerization temperature (80° C.) and polymerization pressure (gauge pressure, 2.1 MPa) of the first vessel constant, and while feeding hydrogen to the first vessel so as to keep a hydrogen concentration in a gas phase of the first vessel constant, propylene was gas-phase polymerized in the presence of the above-transferred propylene homopolymer. Then, all of the propylene homopolymer in the first vessel was transferred to a second vessel mentioned below.

While feeding propylene continuously to the second vessel so as to keep polymerization temperature (80° C.) and polymerization pressure (gauge pressure, 1.7 MPa) of the second vessel constant, and while feeding hydrogen to the second vessel so as to keep a hydrogen concentration in a gas phase of the second vessel constant, propylene was gas-phase polymerized in the presence of the above-transferred propylene homopolymer, thereby producing polymer component (I), which was substantially a mixture of the propylene homopolymer transferred from the first vessel with the propylene homopolymer produced in the second vessel. All of polymer component (1) was transferred to a third vessel mentioned below.

(2) Polymerization Step (II)

While feeding propylene continuously to the third vessel so as to keep polymerization temperature (70° C.) and polymerization pressure (gauge pressure, 1.35 MPa) of the third vessel constant, and while feeding hydrogen and ethylene to the third vessel so as to keep a hydrogen and ethylene concentration in a gas phase of the third vessel constant, propylene and ethylene were gas-phase copolymerized in the presence of above-transferred polymer component (I), thereby producing polymer component (II) of a propylene-ethylene copolymer.

Resultant powder polymer existing in the third vessel was transferred to a deactivation vessel intermittently to deactivate the catalyst component remaining in the powder polymer with water, and then was dried with 80° C.-nitrogen, thereby obtaining propylene polymer (A-2) of a white powder (propylene)-(propylene-ethylene) polymer, which was substantially a mixture of polymer component (I) with polymer component (II).

2. Production of Polypropylene Resin Composition

There were mixed 85 parts by weight of above powder propylene polymer (A-2), 15 parts by weight of ethylene polymer (B-2) and 0.05 part by weight of metal salt (C-1) (amount of its principal component=0.05 (part by weight)×66 (% by weight)=0.033 part by weight) with one another. The resultant mixture was further mixed with 0.05 part by weight of additive (D-1), 0.1 part by weight of additive (D-2), and 0.1 part by weight of additive (D-3) in a tumble mixer, thereby obtaining a mixture.

The obtained mixture was melt kneaded with a co-rotating twin screw kneader (manufactured by Technovel Corporation), its cylinder being divided into three zones C1, C2 and C3 from the upstream side toward the downstream side, and having an inner diameter of 15 mm and L/D of 45, at cylinder temperature of 190° C. (zone C1), 200° C. (zone C2) and 220° C. (zone C3 to a die), at a screw rotation speed of 300 rpm and an extrusion rate of about 6 kg/hour. The resultant melt kneaded mixture was filtered with a sintered metallic filter, FINEPORE NF15N (trademark of Nippon Seisen Co., Ltd.) having a filter precision of 100 μm (referred to hereinafter as "Filter B"), which was placed inside the die attached to the downstream end of the cylinder, then was extruded out of three outlets (diameter: 3 mm) of the die, then was cooled with cold water to form a solidified strand, and then was cut into pellets comprising a polypropylene resin composition.

The pellets were found to have a melt flow rate of 20 g/10 minutes, tensile yield strength of 21 MPa, and Izod impact strength of 8.7 kJ/m$^2$ (−20° C.). Results are shown in Table 4.

Example 5

Example 4 was repeated except that an amount of metal salt (C-1) was changed from 0.05 part by weight to 0.1 part by weight (amount of its principal component=0.1 (part by weight)×66 (% by weight)=0.066 part by weight), thereby obtaining pellets comprising a polypropylene resin composition. The pellets were found to have a melt flow rate of 20 g/10 minutes, tensile yield strength of 21 MPa, and Izod impact strength of 9.1 kJ/m$^2$ (−20° C.). Results are shown in Table 4.

Example 6

Example 4 was repeated except that an amount of metal salt (C-1) was changed from 0.05 part by weight to 0.2 part by weight (amount of its principal component=0.2 (part by weight)×66 (% by weight)=0.132 part by weight), thereby obtaining pellets comprising a polypropylene resin composition. The pellets were found to have a melt flow rate of 20 g/10 minutes, tensile yield strength of 21 MPa, and Izod impact strength of 9.8 kJ/m$^2$ (−20° C.). Results are shown in Table 4.

Comparative Example 6

Example 4 was repeated except that 0.05 part by weight of metal salt (C-1) was changed to 0.2 part by weight of metal salt (C-2), thereby obtaining pellets comprising a polypropylene resin composition. The pellets were found to have a melt flow rate of 18 g/10 minutes, tensile yield strength of 21 MPa, and Izod impact strength of 7.3 kJ/m$^2$ (−20° C.). Results are shown in Table 4.

Comparative Example 7

Example 4 was repeated except that 0.05 part by weight of metal salt (C-1) was changed to 0.2 part by weight of metal salt (C-3), thereby obtaining pellets comprising a polypropylene resin composition. The pellets were found to have a melt flow rate of 19 g/10 minutes, tensile yield strength of 21 MPa, and Izod impact strength of 8.0 kJ/m$^2$ (−20° C.). Results are shown in Table 4.

Comparative Example 8

Example 4 was repeated except that 0.05 part by weight of metal salt (C-1) was changed to 0.2 part by weight of metal salt (C-4), thereby obtaining pellets comprising a polypropylene resin composition. The pellets were found to have a melt flow rate of 21 g/10 minutes, tensile yield strength of 21 MPa, and Izod impact strength of 8.4 kJ/m$^2$ (−20° C.). Results are shown in Table 4.

Comparative Example 9

Example 4 was repeated except that 0.05 part by weight of metal salt (C-1) was changed to 0.2 part by weight of metal salt (C-5), thereby obtaining pellets comprising a polypropylene resin composition. The pellets were found to have a melt flow rate of 20 g/10 minutes, tensile yield strength of 22 MPa, and Izod impact strength of 8.0 kJ/m² (−20° C.). Results are shown in Table 4.

Comparative Example 10

Example 4 was repeated except that metal salt (C-1) was not used, thereby obtaining pellets comprising a polypropylene resin composition. The pellets were found to have a melt flow rate of 19 g/10 minutes, tensile yield strength of 20 MPa, and Izod impact strength of 7.0 kJ/m² (−20° C.). Results are shown in Table 4.

Example 7

Example 4 was repeated except that (i) an amount of propylene polymer (A-2) was changed from 85 parts by weight to 95 parts by weight, (ii) an amount of ethylene polymer (B-2) was changed from 15 parts by weight to 5 parts by weight, and (iii) an amount of metal salt (C-1) was changed from 0.05 part by weight to 0.2 part by weight, thereby obtaining pellets comprising a polypropylene resin composition. The pellets were found to have a melt flow rate of 24 g/10 minutes, tensile yield strength of 25 MPa, and Izod impact strength of 5.0 kJ/m² (−20° C.). Results are shown in Table 4.

Comparative Example 11

Example 4 was repeated except that (i) an amount of propylene polymer (A-2) was changed from 85 parts by weight to 95 parts by weight, (ii) an amount of ethylene polymer (B-2) was changed from 15 parts by weight to 5 parts by weight, and (iii) metal salt (C-1) was not used, thereby obtaining pellets comprising a polypropylene resin composition. The pellets were found to have a melt flow rate of 27 g/10 minutes, tensile yield strength of 23 MPa, and Izod impact strength of 3.9 kJ/m² (−20° C.). Results are shown in Table 4.

Comparative Example 12

Example 4 was repeated except that (i) an amount of propylene polymer (A-2) was changed from 85 parts by weight to 100 parts by weight, (ii) ethylene polymer (B-2) was not used, and (iii) an amount of metal salt (C-1) was changed from 0.05 part by weight to 0.2 part by weight (amount of its principal component=0.02 (part by weight)×66 (% by weight)=0.132 part by weight), thereby obtaining pellets comprising a polypropylene resin composition. The pellets were found to have a melt flow rate of 27 g/10 minutes, tensile yield strength of 26 MPa, and Izod impact strength of 4.0 kJ/m² (−20° C.). Results are shown in Table 4.

Comparative Example 13

Example 4 was repeated except that (i) an amount of propylene polymer (A-2) was changed from 85 parts by weight to 100 parts by weight, (ii) ethylene polymer (B-2) was not used, and (iii) 0.05 parts by weight of metal salt (C-1) was changed to 0.2 part by weight of metal salt (C-2), thereby obtaining pellets comprising a polypropylene resin composition. The pellets were found to have a melt flow rate of 26 g/10 minutes, tensile yield strength of 26 MPa, and Izod impact strength of 3.5 kJ/m² (−20° C.). Results are shown in Table 4.

Comparative Example 14

Example 4 was repeated except that (i) an amount of propylene polymer (A-2) was changed from 85 parts by weight to 100 parts by weight, (ii) ethylene polymer (B-2) was not used, and (iii) metal salt (C-1) was not used, thereby obtaining pellets comprising a polypropylene resin composition. The pellets were found to have a melt flow rate of 30 g/10 minutes, tensile yield strength of 25 MPa, and Izod impact strength of 3.0 kJ/m² (−20° C.). Results are shown in Table 4.

Reference Example 6

There were mixed 95 parts by weight of propylene polymer (A-3), 5 parts by weight of metal salt (C-1) (amount of its principal component=5 (part by weight)×66 (% by weight)= 3.3 part by weight), 0.03 part by weight of additive (D-4), and 0.03 part by weight of additive (D-5) with one another in a tumble mixer.

The resultant mixture was melt kneaded with a co-rotating twin screw kneader (manufactured by Technovel Corporation), its cylinder being divided into four zones C1, C2, C3 and C4 from the upstream side toward the downstream side, and having an inner diameter of 15 mm and L/D of 45, at cylinder temperature of 160° C. (zone C1), 160° C. (zone C2), 180° C. (zone C3) and 200° C. (zone C4 to a die), at a screw rotation speed of 700 rpm and an extrusion rate of about 6 kg/hour. The resultant melt kneaded mixture was filtered with Filter A, which was placed inside the die attached to the downstream end of the cylinder, then was extruded out of three outlets (diameter: 3 mm) of the die, then was cooled with cold water to form a solidified strand, and then was cut, thereby obtaining a master batch (referred to hereinafter as "MB-6") in a pellet form. MB-6 was found to contain 3.3% by weight of the principal component of metal salt (C-1), provided that the total of MB-6 was 100% by weight. Table 5 shows a composition of MB-6.

Reference Example 7

Reference Example 6 was repeated except that (i) an amount of propylene polymer (A-3) was changed from 95 parts by weight to 90 parts by weight, and (ii) 5 parts by weight of metal salt (C-1) was changed to 10 parts by weight of metal salt (C-4), thereby obtaining a master batch (referred to hereinafter as "MB-7") in a pellet form. Table 5 shows a composition of MB-7.

Example 8

There were mixed 84 parts by weight of propylene polymer (A-1), 10 parts by weight of ethylene polymer (B-1), and 6 parts by weight of MB-6 with one another in a tumble mixer. The resultant mixture was melt kneaded with a co-rotating twin screw kneader (manufactured by Technovel Corporation), its cylinder being divided into three zones C1, C2 and C3 from the upstream side toward the downstream side, and having an inner diameter of 15 mm and L/D of 45, at cylinder temperature of 190° C. (zone C1), 210° C. (zone C2) and 230° C. (zone C3 to a die), at a screw rotation speed of 300 rpm and an extrusion rate of about 6 kg/hour. The resultant melt kneaded mixture was filtered with Filter A, which was placed inside the die attached to the downstream end of the cylinder, then was extruded out of three outlets (diameter: 3 mm) of the die, then was cooled with cold water to form a solidified strand, and then was cut into pellets comprising a polypropylene resin composition. The pellets were found to contain 0.2% by weight of metal salt (C-1), provided that the total of the pellets was 100% by weight.

The above pellets were found to have a melt flow rate of 4.2 g/10 minutes, tensile yield strength of 35 MPa, and Izod impact strength of 15.3 kJ/m² (23° C.) and 1.6 kJ/m² (−20° C.) Results are shown in Table 6.

Example 9

Example 8 was repeated except that 10 parts by weight of ethylene polymer (B-1) was changed to 10 parts by weight of ethylene polymer (B-3), thereby obtaining pellets comprising a polypropylene resin composition.

The pellets were found to have a melt flow rate of 4.3 g/10 minutes, tensile yield strength of 34 MPa, and Izod impact strength of 33.6 kJ/m² (23° C.) and 1.5 kJ/m² (−20° C.). Results are shown in Table 6.

Example 10

Example 8 was repeated except that 10 parts by weight of ethylene polymer (B-1) was changed to 10 parts by weight of ethylene polymer (B-4), thereby obtaining pellets comprising a polypropylene resin composition.

The pellets were found to have a melt flow rate of 3.9 g/10 minutes, tensile yield strength of 35 MPa, and Izod impact strength of 11.4 kJ/m² (23° C.) and 1.5 kJ/m² (−20° C.) Results are shown in Table 6.

Comparative Example 15

Example 8 was repeated except that (i) an amount of propylene polymer (A-1) was changed from 84 parts by weight to 87 parts by weight, and (ii) 6 parts by weight of MB-6 was changed to 3 parts by weight of MB-7, thereby obtaining pellets comprising a polypropylene resin composition.

The pellets were found to have a melt flow rate of 3.9 g/10 minutes, tensile yield strength of 35 MPa, and Izod impact strength of 12.2 kJ/m² (23° C.) and 1.4 kJ/m² (−20° C.) Results are shown in Table 6.

Comparative Example 16

Example 8 was repeated except that (i) an amount of propylene polymer (A-1) was changed from 84 parts by weight to 87 parts by weight, (ii) 10 parts by weight of ethylene polymer (B-1) was changed to 10 parts by weight of ethylene polymer (B-3), and (iii) 6 parts by weight of MB-6 was changed to 3 parts by weight of MB-7, thereby obtaining pellets comprising a polypropylene resin composition.

The pellets were found to have a melt flow rate of 4.2 g/10 minutes, tensile yield strength of 34 MPa, and Izod impact strength of 23.6 kJ/m² (23° C.) and 1.5 kJ/m² (−20° C.). Results are shown in Table 6.

Comparative Example 17

Example 8 was repeated except that (i) an amount of propylene polymer (A-1) was changed from 84 parts by weight to 87 parts by weight, (ii) 10 parts by weight of ethylene polymer (B-1) was changed to 10 parts by weight of ethylene polymer (B-4), and (iii) 6 parts by weight of MB-6 was changed to 3 parts by weight of MB-7, thereby obtaining pellets comprising a polypropylene resin composition.

The pellets were found to have a melt flow rate of 3.9 g/10 minutes, tensile yield strength of 35 MPa, and Izod impact strength of 6.2 kJ/m² (23° C.) and 1.4 kJ/m² (−20° C.) Results are shown in Table 6.

Example 11

1. Production of Propylene Polymer (A-4)

(1) Step (I)

A loop type liquid-phase polymerization reactor made of stainless used steel was purged thoroughly with propylene. To the reactor were supplied triethylaluminum and cyclohexylethyldimethoxysilane. While adjusting inner temperature of the reactor to 56 to 58° C., and feeding propylene and hydrogen to the reactor so as to adjust inner pressure (gauge pressure) of the reactor to 3.5 MPa, there was supplied continuously a solid catalyst component produced by a method disclosed in Example 1 of JP 2004-182981A to the reactor, thereby polymerizing propylene in a liquid-phase. The resultant propylene homopolymer sampled from step (I) was found to have an intrinsic viscosity ([η]) of 1.61 dl/g, and an isotactic pentad fraction of 0.981. All of the resultant propylene homopolymer was transferred to step (II).

(2) Step (II)

While feeding propylene continuously to a gas-phase polymerization reactor so as to keep polymerization temperature (86° C.) and polymerization pressure (gauge pressure, 2.1 MPa) of the gas-phase polymerization reactor constant, and while feeding hydrogen to the gas-phase polymerization reactor so as to keep a hydrogen concentration in a gas phase of the gas-phase polymerization reactor constant, propylene was gas-phase polymerized in the presence of the above-transferred propylene homopolymer, thereby obtaining a powder polymer mixture of the propylene homopolymer produced in step (I) with the propylene homopolymer produced in step (II).

The powder polymer mixture existing in the gas-phase polymerization reactor was transferred to a deactivation vessel intermittently to deactivate the catalyst component remaining in the powder polymer mixture with water, and then was dried with 110° C.-nitrogen, thereby obtaining propylene polymer (A-4).

Propylene polymer (A-4) was found to contain 10 parts by weight of the propylene homopolymer produced in step (I), and 90 parts by weight of the propylene homopolymer produced in step (II).

2. Production of Polypropylene Resin Composition

There were mixed 85 parts by weight of propylene polymer (A-4), 15 parts by weight of ethylene polymer (B-2) and 0.2 part by weight of metal salt (C-1) (amount of its principal component=0.2 (part by weight)×66 (% by weight)=0.132 part by weight) with one another. The resultant mixture was further mixed with 0.05 part by weight of additive (D-1), 0.1 part by weight of additive (D-2), and 0.1 part by weight of additive (D-3) in a tumble mixer, thereby obtaining a mixture.

The obtained mixture was melt kneaded with a co-rotating twin screw kneader (manufactured by Technovel Corporation), its cylinder being divided into three zones C1, C2 and C3 from the upstream side toward the downstream side, and having an inner diameter of 15 mm and L/D of 45, at cylinder temperature of 190° C. (zone C1), 200° C. (zone C2) and 220° C. (zone C3 to a die), at a screw rotation speed of 300 rpm and an extrusion rate of about 6 kg/hour. The resultant melt kneaded mixture was filtered with Filter B, which was placed inside the die attached to the downstream end of the cylinder, then was extruded out of three outlets (diameter: 3 mm) of the die, then was cooled with cold water to form a solidified strand, and then was cut into pellets comprising a polypropylene resin composition.

The pellets were found to have a melt flow rate of 8.0 g/10 minutes, tensile yield strength of 33 MPa, and Izod impact strength of 27.3 kJ/m² (23° C.) and 2.4 kJ/m² (−20° C.) Results are shown in Table 7.

Example 12

Example 11 was repeated except that 15 parts by weight of ethylene polymer (B-2) was changed to 15 parts by weight of ethylene polymer (B-5), thereby obtaining pellets comprising a polypropylene resin composition.

The pellets were found to have a melt flow rate of 8.2 g/10 minutes, tensile yield strength of 33 MPa, and Izod impact strength of 29.6 kJ/m² (23° C.) and 2.9 kJ/m² (−20° C.). Results are shown in Table 7.

Comparative Example 18

Example 11 was repeated except that 0.2 part by weight of metal salt (C-1) was changed to 0.2 part by weight of metal salt (C-4), thereby obtaining pellets comprising a polypropylene resin composition.

The pellets were found to have a melt flow rate of 7.6 g/10 minutes, tensile yield strength of 33 MPa, and Izod impact strength of 24.0 kJ/m² (23° C.) and 2.3 kJ/m² (−20° C.). Results are shown in Table 7.

Comparative Example 19

Example 11 was repeated except that (i) 15 parts by weight of ethylene polymer (B-2) was changed to 15 parts by weight of ethylene polymer (B-5), and (ii) 0.2 part by weight of metal salt (C-1) was changed to 0.2 part by weight of metal salt (C-4), thereby obtaining pellets comprising a polypropylene resin composition.

The pellets were found to have a melt flow rate of 7.6 g/10 minutes, tensile yield strength of 32 MPa, and Izod impact strength of 22.8 kJ/m² (23° C.) and 2.3 kJ/m² (−20° C.). Results are shown in Table 7.

Comparative Example 20

Example 11 was repeated except that 15 parts by weight of ethylene polymer (B-2) was changed to 15 parts by weight of ethylene polymer (B-6), thereby obtaining pellets comprising a polypropylene resin composition.

The pellets were found to have a melt flow rate of 11.8 g/10 minutes, tensile yield strength of 40 MPa, and Izod impact strength of 2.8 kJ/m² (23° C.) and 1.4 kJ/m² (−20° C.). Results are shown in Table 7.

Comparative Example 21

Example 11 was repeated except that (i) an amount of propylene polymer (A-4) was changed from 85 parts by weight to 100 parts by weight, (ii) ethylene polymer (B-2) was not used, thereby obtaining pellets comprising a polypropylene resin composition.

The pellets were found to have a melt flow rate of 9.4 g/10 minutes, tensile yield strength of 42 MPa, and Izod impact strength of 2.5 kJ/m² (23° C.) and 1.4 kJ/m² (−20° C.). Results are shown in Table 7.

Example 13

1. Production of Propylene Polymer (A-5)

(1) Step (I)

A loop type liquid-phase polymerization reactor made of stainless used steel was purged thoroughly with propylene and ethylene. To the reactor were supplied triethylaluminum and cyclohexylethyldimethoxysilane. While adjusting inner temperature of the reactor to 54 to 56° C., and feeding propylene, ethylene and hydrogen to the reactor so as to adjust inner pressure (gauge pressure) of the reactor to 3.5 MPa, there was supplied continuously a solid catalyst component produced by a method disclosed in Example 1 of JP 2004-182981A to the reactor, thereby copolymerizing propylene with ethylene in a liquid phase. The resultant propylene-ethylene random copolymer sampled from step (I) was found to have an intrinsic viscosity ($[\eta]$) of 1.7 dl/g, and was found to contain 2.5% by weight of an ethylene unit. All of the resultant propylene-ethylene random copolymer was transferred to step (II).

(2) Step (II)

While feeding propylene and ethylene continuously to a gas-phase polymerization reactor so as to keep polymerization temperature (81° C.) and polymerization pressure (gauge pressure, 2.1 MPa) of the gas-phase polymerization reactor constant, and while feeding hydrogen to the gas-phase polymerization reactor so as to keep a hydrogen concentration in a gas phase of the gas-phase polymerization reactor constant, propylene and ethylene were copolymerized in a gas phase in the presence of the above-transferred propylene-ethylene random copolymer, thereby obtaining a powder polymer mixture of the propylene-ethylene random copolymer produced in step (I) with the propylene-ethylene random copolymer produced in step (II).

The powder polymer mixture existing in the gas-phase polymerization reactor was transferred to a deactivation vessel intermittently to deactivate the catalyst component remaining in the powder polymer mixture with water, and then was dried with 95° C.-nitrogen, thereby obtaining propylene polymer (A-5).

Propylene polymer (A-5) was found to contain 6 parts by weight of the propylene-ethylene random copolymer produced in step (I), and 94 parts by weight of the propylene-ethylene random copolymer produced in step (II).

2. Production of Polypropylene Resin Composition

There were mixed 85 parts by weight of propylene polymer (A-5), 15 parts by weight of ethylene polymer (B-2) and 0.2 part by weight of metal salt (C-1) (amount of its principal component=0.2 (part by weight)×66 (% by weight)=0.132 part by weight) with one another. The resultant mixture was further mixed with 0.05 part by weight of additive (D-1), 0.1 part by weight of additive (D-2), and 0.1 part by weight of additive (D-3) in a tumble mixer, thereby obtaining a mixture.

The obtained mixture was melt kneaded with a co-rotating twin screw kneader (manufactured by Technovel Corporation), its cylinder being divided into three zones C1, C2 and C3 from the upstream side toward the downstream side, and having an inner diameter of 15 mm and L/D of 45, at cylinder temperature of 190° C. (zone C1), 200° C. (zone C2) and 220° C. (zone C3 to a die), at a screw rotation speed of 300 rpm and an extrusion rate of about 6 kg/hour. The resultant melt kneaded mixture was filtered with Filter B, which was placed inside the die attached to the downstream end of the cylinder, then was extruded out of three outlets (diameter: 3 mm) of the die, then was cooled with cold water to form a solidified strand, and then was cut into pellets comprising a polypropylene resin composition.

The pellets were found to have a melt flow rate of 5.6 g/10 minutes, tensile yield strength of 24 MPa, and Izod impact strength of 40.8 kJ/m² (23° C.) and 2.4 kJ/m² (−20° C.) Results are shown in Table 8.

Example 14

Example 13 was repeated except that 15 parts by weight of ethylene polymer (B-2) was changed to 15 parts by weight of ethylene polymer (B-5), thereby obtaining pellets comprising a polypropylene resin composition.

The pellets were found to have a melt flow rate of 5.6 g/10 minutes, tensile yield strength of 23 MPa, and Izod impact strength of 42.4 kJ/m² (23° C.) and 2.5 kJ/m² (−20° C.) Results are shown in Table 8.

Comparative Example 22

Example 13 was repeated except that 0.2 part by weight of metal salt (C-1) was changed to 0.2 part by weight of metal salt (C-4), thereby obtaining pellets comprising a polypropylene resin composition.

The pellets were found to have a melt flow rate of 5.5 g/10 minutes, tensile yield strength of 24 MPa, and Izod impact strength of 34.3 kJ/m² (23° C.) and 2.2 kJ/m² (−20° C.) Results are shown in Table 8.

Comparative Example 23

Example 13 was repeated except that (i) 15 parts by weight of ethylene polymer (B-2) was changed to 15 parts by weight of ethylene polymer (B-5), and (ii) 0.2 part by weight of metal salt (C-1) was changed to 0.2 part by weight of metal salt (C-4), thereby obtaining pellets comprising a polypropylene resin composition.

The pellets were found to have a melt flow rate of 5.3 g/10 minutes, tensile yield strength of 23 MPa, and Izod impact strength of 37.2 kJ/m² (23° C.) and 2.4 kJ/m² (−20° C.) Results are shown in Table 8.

Comparative Example 24

Example 13 was repeated except that 15 parts by weight of ethylene polymer (B-2) was changed to 15 parts by weight of ethylene polymer (B-6), thereby obtaining pellets comprising a polypropylene resin composition.

The pellets were found to have a melt flow rate of 7.8 g/10 minutes, tensile yield strength of 29 MPa, and Izod impact strength of 4.7 kJ/m² (23° C.) and 1.4 kJ/m² (−20° C.) Results are shown in Table 8.

Comparative Example 25

Example 13 was repeated except that (i) an amount of propylene polymer (A-5) was changed from 85 parts by weight to 100 parts by weight, (ii) ethylene polymer (B-2) was not used, thereby obtaining pellets comprising a polypropylene resin composition.

The pellets were found to have a melt flow rate of 6.2 g/10 minutes, tensile yield strength of 31 MPa, and Izod impact strength of 5.8 kJ/m² (23° C.) and 1.4 kJ/m² (−20° C.) Results are shown in Table 8.

Example 15

Example 11 was repeated except that (i) 85 parts by weight of propylene polymer (A-4) was changed to 90 parts by weight, and (ii) 15 parts by weight of ethylene polymer (B-2) was changed to 10 parts by weight of ethylene polymer (B-7), thereby obtaining pellets comprising a polypropylene resin composition.

The pellets were found to have a melt flow rate of 10.8 g/10 minutes, tensile yield strength of 38 MPa, and Izod impact strength of 2.7 kJ/m² (23° C.) and 1.5 kJ/m² (−20° C.) Results are shown in Table 9.

Example 16

Example 11 was repeated except that (i) 85 parts by weight of propylene polymer (A-4) was changed to 90 parts by weight, and (ii) 15 parts by weight of ethylene polymer (B-2) was changed to 10 parts by weight of ethylene polymer (B-8), thereby obtaining pellets comprising a polypropylene resin composition.

The pellets were found to have a melt flow rate of 10.6 g/10 minutes, tensile yield strength of 38 MPa, and Izod impact strength of 2.8 kJ/m² (23° C.) and 1.5 kJ/m² (−20° C.) Results are shown in Table 9.

Example 17

Example 11 was repeated except that (i) 85 parts by weight of propylene polymer (A-4) was changed to 80 parts by weight, and (ii) 15 parts by weight of ethylene polymer (B-2) was changed to 20 parts by weight of ethylene polymer (B-8), thereby obtaining pellets comprising a polypropylene resin composition.

The pellets were found to have a melt flow rate of 12.6 g/10 minutes, tensile yield strength of 34 MPa, and Izod impact strength of 2.5 kJ/m² (23° C.) and 1.5 kJ/m² (−20° C.). Results are shown in Table 9.

Example 18

Example 11 was repeated except that (i) 85 parts by weight of propylene polymer (A-4) was changed to 70 parts by weight, and (ii) 15 parts by weight of ethylene polymer (B-2) was changed to 30 parts by weight of ethylene polymer (B-8), thereby obtaining pellets comprising a polypropylene resin composition.

The pellets were found to have a melt flow rate of 14.8 g/10 minutes, tensile yield strength of 31 MPa, and Izod impact strength of 2.9 kJ/m² (23° C.) and 1.5 kJ/m² (−20° C.) Results are shown in Table 9.

Example 19

Example 11 was repeated except that (i) 85 parts by weight of propylene polymer (A-4) was changed to 60 parts by weight, and (ii) 15 parts by weight of ethylene polymer (B-2) was changed to 40 parts by weight of ethylene polymer (B-8), thereby obtaining pellets comprising a polypropylene resin composition.

The pellets were found to have a melt flow rate of 17.7 g/10 minutes, tensile yield strength of 27 MPa, and Izod impact strength of 3.0 kJ/m² (23° C.) and 2.2 kJ/m² (−20° C.) Results are shown in Table 9.

Comparative Example 26

Example 11 was repeated except that (i) 85 parts by weight of propylene polymer (A-4) was changed to 40 parts by weight, and (ii) 15 parts by weight of ethylene polymer (B-2)

was changed to 60 parts by weight of ethylene polymer (B-8), thereby obtaining pellets comprising a polypropylene resin composition.

The pellets were found to have a melt flow rate of 23.6 g/10 minutes, tensile yield strength of 19 MPa, and Izod impact strength of 2.7 kJ/m² (23° C.) and 2.2 kJ/m² (−20° C.). Results are shown in Table 9.

Comparative Example 27

Example 11 was repeated except that (i) 85 parts by weight of propylene polymer (A-4) was changed to 30 parts by weight, and (ii) 15 parts by weight of ethylene polymer (B-2) was changed to 70 parts by weight of ethylene polymer (B-8), thereby obtaining pellets comprising a polypropylene resin composition.

The pellets were found to have a melt flow rate of 27.8 g/10 minutes, tensile yield strength of 15 MPa, and Izod impact strength of 3.7 kJ/m² (23° C.) and 2.9 kJ/m² (−20° C.). Results are shown in Table 9.

Comparative Example 28

Example 11 was repeated except that (i) 85 parts by weight of propylene polymer (A-4) was changed to 10 parts by weight, and (ii) 15 parts by weight of ethylene polymer (B-2) was changed to 90 parts by weight of ethylene polymer (B-8), thereby obtaining pellets comprising a polypropylene resin composition.

The pellets were found to have a melt flow rate of 35.8 g/10 minutes, tensile yield strength of 10 MPa, and Izod impact strength of 26.6 kJ/m² (23° C.) and 6.7 kJ/m² (−20° C.). Results are shown in Table 9.

Comparative Example 29

Example 11 was repeated except that (i) 85 parts by weight of propylene polymer (A-4) was changed to 10 parts by weight, and (ii) 15 parts by weight of ethylene polymer (B-2) was changed to 90 parts by weight of ethylene polymer (B-7), thereby obtaining pellets comprising a polypropylene resin composition.

The pellets were found to have a melt flow rate of 50.3 g/10 minutes, and Izod impact strength of 35.4 kJ/m² (23° C.) and 4.6 kJ/m² (−20° C.). Tensile yield strength was not able to be measured. Results are shown in Table 9.

TABLE 1

|  | Example 1 | Comparative Example 1 | Comparative Example 2 |
|---|---|---|---|
| Component (part by weight) Propylene polymer (A) | | | |
| A-1 | 87 | 87 | 87 |
| A-3 | 3 | 3 | 3 |
| Ethylene polymer (B) | | | |
| B-1 | 10 | 10 | 10 |
| Metal salt (C) | | | |
| C-1 | 0.3 | | |
| C-5 | | 0.3 | |
| Property of resin composition | | | |
| MFR (g/10 minutes, 230° C.) | 4.6 | 4.4 | 3.9 |
| Tensile yield strength (MPa) | 33 | 34 | 33 |

TABLE 1-continued

|  | Example 1 | Comparative Example 1 | Comparative Example 2 |
|---|---|---|---|
| Izod impact strength | | | |
| 23° C. (kJ/m²) | 7.7 | 5.2 | 4.8 |
| −20° C. (kJ/m²) | 1.6 | 1.5 | 1.5 |

TABLE 2

|  | Reference Example | | | | |
|---|---|---|---|---|---|
|  | 1 | 2 | 3 | 4 | 5 |
| Master batch No. | MB-1 | MB-2 | MB-3 | MB-4 | M-5 |
| Component (part by weight) Propylene polymer (A) | | | | | |
| A-3 | 90 | | 90 | | |
| Ethylene polymer (B) | | | | | |
| B-1 | | 90 | | 90 | 90 |
| Metal salt (C) | | | | | |
| C-1 | 10 | 10 | | | |
| C-5 | | | 10 | 10 | |
| C-6 | | | | | 10 |
| Additive (D) | | | | | |
| D-4 | 0.03 | 0.03 | 0.03 | 0.03 | 0.03 |
| D-5 | 0.3 | 0.3 | 0.3 | 0.3 | 0.3 |

TABLE 3

|  | Example | | Comparative Example | | |
|---|---|---|---|---|---|
|  | 2 | 3 | 3 | 4 | 5 |
| MB (part by weight) (Note-1) | | | | | |
| MB-1 | 3 | | | | |
| A-3 | 2.7 ≈ 3 | | | | |
| C-1 | 0.3 | | | | |
| MB-2 | | 3 | | | |
| B-1 | | 2.7 ≈ 3 | | | |
| C-1 | | 0.3 | | | |
| MB-3 | | | 3 | | |
| A-3 | | | 2.7 ≈ 3 | | |
| C-5 | | | 0.3 | | |
| MB-4 | | | | 3 | |
| B-1 | | | | 2.7 ≈ 3 | |
| C-5 | | | | 0.3 | |
| MB-5 | | | | | 3 |
| B-1 | | | | | 2.7 ≈ 3 |
| C-6 | | | | | 0.3 |
| Component (part by weight) (Note-2) | | | | | |
| A-1 | 87 | 87 | 87 | 87 | 87 |
| A-3 | 3 | | 3 | | |
| B-1 | 10 | 13 | 10 | 13 | 13 |
| C-1 | 0.3 | 0.3 | | | |
| C-5 | | | 0.3 | 0.3 | |
| C-6 | | | | | 0.3 |
| Property of resin composition | | | | | |
| MFR (g/10 minutes, 230° C.) | 4.7 | 4.6 | 4.1 | 4.4 | 4.5 |
| Tensile yield strength (MPa) | 34 | 32 | 35 | 35 | 34 |

TABLE 3-continued

|  | Example | | Comparative Example | | |
|---|---|---|---|---|---|
|  | 2 | 3 | 3 | 4 | 5 |
| Izod impact strength | | | | | |
| 23° C. (kJ/m$^2$) | 12.6 | 14.1 | 7.8 | 9.3 | 6.1 |
| −20° C. (kJ/m$^2$) | 1.6 | 1.5 | 1.5 | 1.5 | 1.4 |

TABLE 4

|  | Example | | | | Comparative Example | | |
|---|---|---|---|---|---|---|---|
|  | 4 | 5 | 6 | 7 | 6 | 7 | 8 |
| Component (part by weight) | | | | | | | |
| Propylene polymer (A) | | | | | | | |
| A-2 | 85 | 85 | 85 | 95 | 85 | 85 | 85 |
| Ethylene polymer (B) | | | | | | | |
| B-2 | 15 | 15 | 15 | 5 | 15 | 15 | 15 |
| Metal salt (C) | | | | | | | |
| C-1 | 0.05 | 0.1 | 0.2 | 0.2 | | | |
| C-2 | | | | | 0.2 | | |
| C-3 | | | | | | 0.2 | |
| C-4 | | | | | | | 0.2 |
| Additive (D) | | | | | | | |
| D-1 | 0.05 | 0.05 | 0.05 | 0.05 | 0.05 | 0.05 | 0.05 |
| D-2 | 0.1 | 0.1 | 0.1 | 0.1 | 0.1 | 0.1 | 0.1 |
| D-3 | 0.1 | 0.1 | 0.1 | 0.1 | 0.1 | 0.1 | 0.1 |
| Property of resin composition | | | | | | | |
| MFR (g/10 minutes, 230° C.) | 20 | 20 | 20 | 24 | 18 | 19 | 21 |
| Tensile yield strength (MPa) | 21 | 21 | 21 | 25 | 21 | 21 | 21 |
| Izod impact strength | | | | | | | |
| −20° C. (kJ/m$^2$) | 8.7 | 9.1 | 9.8 | 5.0 | 7.3 | 8.0 | 8.4 |

TABLE 4-continued

|  | Comparative Example | | | | | |
|---|---|---|---|---|---|---|
|  | 9 | 10 | 11 | 12 | 13 | 14 |
| Component (part by weight) | | | | | | |
| Propylene polymer (A) | | | | | | |
| A-2 | 85 | 85 | 95 | 100 | 100 | 100 |
| Ethylene polymer (B) | | | | | | |
| B-2 | 15 | 15 | 5 | | | |
| Metal salt (C) | | | | | | |
| C-1 | | | | 0.2 | | |
| C-2 | | | | | 0.2 | |
| C-5 | 0.2 | | | | | |
| Additive (D) | | | | | | |
| D-1 | 0.05 | 0.05 | 0.05 | 0.05 | 0.05 | 0.05 |
| D-2 | 0.1 | 0.1 | 0.1 | 0.1 | 0.1 | 0.1 |
| D-3 | 0.1 | 0.1 | 0.1 | 0.1 | 0.1 | 0.1 |
| Property of resin composition | | | | | | |
| MFR (g/10 minutes, 230° C.) | 20 | 19 | 27 | 27 | 26 | 30 |
| Tensile yield strength (MPa) | 22 | 20 | 23 | 26 | 26 | 25 |
| Izod impact strength | | | | | | |
| −20° C. (kJ/m$^2$) | 8.0 | 7.0 | 3.9 | 4.0 | 3.5 | 3.0 |

TABLE 5

|  | Reference Example | |
|---|---|---|
|  | 6 | 7 |
| Master batch No. | MB-6 | MB-7 |
| Component (part by weight) | | |
| Propylene polymer (A) | | |
| A-3 | 95 | 90 |
| Metal salt (C) | | |
| C-1 | 5 | |
| C-4 | | 10 |
| Additive (D) | | |
| D-4 | 0.03 | 0.03 |
| D-5 | 0.03 | 0.03 |

TABLE 6

|  | Example | | | Comparative Example | | |
|---|---|---|---|---|---|---|
|  | 8 | 9 | 10 | 15 | 16 | 17 |
| MB (part by weight) (Note-1) | | | | | | |
| MB-6 | 6 | 6 | 6 | | | |
| A-3 | 5.7 ≈ 6 | 5.7 ≈ 6 | 5.7 ≈ 6 | | | |
| C-1 | 0.3 | 0.3 | 0.3 | | | |
| MB-7 | | | | 3 | 3 | 3 |
| A-3 | | | | 2.7 ≈ 3 | 2.7 ≈ 3 | 2.7 ≈ 3 |
| C-4 | | | | 0.3 | 0.3 | 0.3 |

TABLE 6-continued

|  | Example | | | Comparative Example | | |
| --- | --- | --- | --- | --- | --- | --- |
|  | 8 | 9 | 10 | 15 | 16 | 17 |
| Component (part by weight) (Note-2) | | | | | | |
| A-1 | 84 | 84 | 84 | 87 | 87 | 87 |
| A-3 | 6 | 6 | 6 | 3 | 3 | 3 |
| B-1 | 10 | | | 10 | | |
| B-3 | | 10 | | | 10 | |
| B-4 | | | 10 | | | 10 |
| C-1 | 0.3 | 0.3 | 0.3 | | | |
| C-4 | | | | 0.3 | 0.3 | 0.3 |
| Property of resin composition | | | | | | |
| MFR (g/10 minutes, 230° C.) | 4.2 | 4.3 | 3.9 | 3.9 | 4.2 | 3.9 |
| Tensile yield strength (MPa) | 35 | 34 | 35 | 35 | 34 | 35 |
| Izod impact strength | | | | | | |
| 23° C. (kJ/m$^2$) | 15.3 | 33.6 | 11.4 | 12.2 | 23.6 | 6.2 |
| −20° C. (kJ/m$^2$) | 1.6 | 1.5 | 1.5 | 1.4 | 1.5 | 1.4 |

Note-1:
This section shows a kind and amount of the master batches used for making respective polypropylene resin compositions (MB-1 to MB-5 in Table 3, and MB-6 and MB-7 in Table 6), and also shows a kind and amount of the components other than additive (D) contained in the respective master batches used (components (A), (B) and (C) in Table 3, and components (A) and (C) in Table 6). For example, Example 2 in Table 3 used MB-1 in an amount of 3 parts by weight, which contained 2.7 parts by weight≈3 parts by weight of A-3 and 0.3 part by weight of C-1.

Note-2:
This section shows a kind and total amount of the components (A), (B) and (C) other than additive (D) used for making respective polypropylene resin compositions, and the above total amount of the components (A), (B) and (C) incorporated the amount of the components (A), (B) and (C) calculated in Note-1.

TABLE 7

|  | Example | | Comparative Example | | | |
| --- | --- | --- | --- | --- | --- | --- |
|  | 11 | 12 | 18 | 19 | 20 | 21 |
| Component (part by weight) | | | | | | |
| Propylene polymer (A) | | | | | | |
| A-4 | 85 | 85 | 85 | 85 | 85 | 100 |
| Ethylene polymer (B) | | | | | | |
| B-2 | 15 | | 15 | | | |
| B-5 | | 15 | | 15 | | |
| B-6 | | | | | 15 | |
| Metal salt (C) | | | | | | |
| C-1 | 0.2 | 0.2 | | | 0.2 | 0.2 |
| C-4 | | | 0.2 | 0.2 | | |
| Additive (D) | | | | | | |
| D-1 | 0.05 | 0.05 | 0.05 | 0.05 | 0.05 | 0.05 |
| D-2 | 0.1 | 0.1 | 0.1 | 0.1 | 0.1 | 0.1 |
| D-3 | 0.1 | 0.1 | 0.1 | 0.1 | 0.1 | 0.1 |
| Property of resin composition | | | | | | |
| MFR (g/10 minutes, 230° C.) | 8.0 | 8.2 | 7.6 | 7.6 | 11.8 | 9.4 |
| Tensile yield strength (MPa) | 33 | 33 | 33 | 32 | 40 | 42 |

TABLE 7-continued

|  | Example | | Comparative Example | | | |
| --- | --- | --- | --- | --- | --- | --- |
|  | 11 | 12 | 18 | 19 | 20 | 21 |
| Izod impact strength | | | | | | |
| 23° C. (kJ/m$^2$) | 27.3 | 29.6 | 24.0 | 22.8 | 2.8 | 2.5 |
| −20° C. (kJ/m$^2$) | 2.4 | 2.9 | 2.3 | 2.3 | 1.4 | 1.4 |

TABLE 8

|  | Example | | Comparative Example | | | |
| --- | --- | --- | --- | --- | --- | --- |
|  | 13 | 14 | 22 | 23 | 24 | 25 |
| Component (part by weight) | | | | | | |
| Propylene polymer (A) | | | | | | |
| A-5 | 85 | 85 | 85 | 85 | 85 | 100 |
| Ethylene polymer (B) | | | | | | |
| B-2 | 15 | | 15 | | | |
| B-5 | | 15 | | 15 | | |
| B-6 | | | | | 15 | |
| Metal salt (C) | | | | | | |
| C-1 | 0.2 | 0.2 | | | 0.2 | 0.2 |
| C-4 | | | 0.2 | 0.2 | | |
| Additive (D) | | | | | | |
| D-1 | 0.05 | 0.05 | 0.05 | 0.05 | 0.05 | 0.05 |
| D-2 | 0.1 | 0.1 | 0.1 | 0.1 | 0.1 | 0.1 |
| D-3 | 0.1 | 0.1 | 0.1 | 0.1 | 0.1 | 0.1 |
| Property of resin composition | | | | | | |
| MFR (g/10 minutes, 230° C.) | 5.6 | 5.6 | 5.5 | 5.3 | 7.8 | 6.2 |
| Tensile yield strength (MPa) | 24 | 23 | 24 | 23 | 29 | 31 |
| Izod impact strength | | | | | | |
| 23° C. (kJ/m$^2$) | 40.8 | 42.4 | 34.3 | 37.2 | 4.7 | 5.8 |
| −20° C. (kJ/m$^2$) | 2.4 | 2.5 | 2.2 | 2.4 | 1.4 | 1.4 |

TABLE 9

|  | Example | | | | |
|---|---|---|---|---|---|
|  | 15 | 16 | 17 | 18 | 19 |
| Component (part by weight) Propylene polymer (A) | | | | | |
| A-4 | 90 | 90 | 80 | 70 | 60 |
| Ethylene polymer (B) | | | | | |
| B-7 | 10 | | | | |
| B-8 | | 10 | 20 | 30 | 40 |
| Metal salt (C) | | | | | |
| C-1 | 0.2 | 0.2 | 0.2 | 0.2 | 0.2 |
| Additive (D) | | | | | |
| D-1 | 0.05 | 0.05 | 0.05 | 0.05 | 0.05 |
| D-2 | 0.1 | 0.1 | 0.1 | 0.1 | 0.1 |
| D-3 | 0.1 | 0.1 | 0.1 | 0.1 | 0.1 |
| Property of resin composition | | | | | |
| MFR (g/10 minutes, 230° C.) | 10.8 | 10.6 | 12.6 | 14.8 | 17.7 |
| Tensile yield strength (MPa) | 38 | 38 | 34 | 31 | 27 |
| Izod impact strength | | | | | |
| 23° C. (kJ/m$^2$) | 2.7 | 2.8 | 2.5 | 2.9 | 3.0 |
| −20° C. (kJ/m$^2$) | 1.5 | 1.5 | 1.5 | 1.5 | 2.2 |

|  | Comparative Example | | | |
|---|---|---|---|---|
|  | 26 | 27 | 28 | 29 |
| Component (part by weight) Propylene polymer (A) | | | | |
| A-4 | 40 | 30 | 10 | 10 |
| Ethylene polymer (B) | | | | |
| B-7 | | | | 90 |
| B-8 | 60 | 70 | 90 | |
| Metal salt (C) | | | | |
| C-1 | 0.2 | 0.2 | 0.2 | 0.2 |
| Additive (D) | | | | |
| D-1 | 0.05 | 0.05 | 0.05 | 0.05 |
| D-2 | 0.1 | 0.1 | 0.1 | 0.1 |
| D-3 | 0.1 | 0.1 | 0.1 | 0.1 |
| Property of resin composition | | | | |
| MFR (g/10 minutes, 230° C.) | 23.6 | 27.8 | 35.8 | 50.3 |
| Tensile yield strength (MPa) | 19 | 15 | 10 | 0 |
| Izod impact strength | | | | |
| 23° C. (kJ/m$^2$) | 2.7 | 3.7 | 26.6 | 35.4 |
| −20° C. (kJ/m$^2$) | 2.2 | 2.9 | 6.7 | 4.6 |

The invention claimed is:

1. A polypropylene resin composition comprising:
100 parts by weight of a resin composition, which contains 51 to 99% by weight of a propylene polymer and 1 to 49% by weight of an ethylene polymer,
wherein the ethylene polymer is an ethylene-α-olefin copolymer containing 51 to 99% by weight of an ethylene unit and 1 to 49% by weight of an α-olefin unit having 4 to 10 carbon atoms, and having a density of 0.85 to 0.93 g/cm$^3$, and a melt flow rate of 0.5 to 50 g/10 minutes measured at 190° C. under a load of 2.16 kg, provided that the total of the ethylene unit and the α-olefin unit is 100% by weight,
provided that the total of the propylene polymer and the ethylene polymer is 100% by weight; and
0.001 to 0.5 part by weight of a metal salt represented by following formula (I),

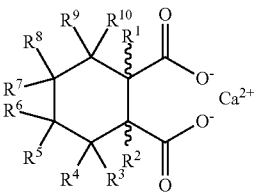

wherein $R^1$ to $R^{10}$ are independently of one another a hydrogen atom, an alkyl group having 1 to 9 carbon atoms, a hydroxyl group, an alkoxy group having 1 to 9 carbon atoms, an amino group, an alkylamine group having 1 to 9 carbon atoms, a halogen atom, a phenyl group, or a group represented by the formula, R—(R'—O)$_n$—, R being an alkyl group having 1 to 3 carbon atoms, R' being an alkylene group having 2 or 3 carbon atoms, and n being an integer of 1 to 4; any two alkyl groups of $R^1$ to $R^{10}$ may be linked to each other, thereby forming a carbon ring having 3 to 6 carbon atoms; and $R^1$ and $R^2$ have a trans or cis configuration with each other.

2. The polypropylene resin composition according to claim 1, wherein the propylene polymer is a propylene random copolymer satisfying the following requirements (a) and (b):
   (a) its melt flow rate is 0.5 to 200 g/10 minutes, measured at 230° C. under a load of 2.16 kg; and
   (b) it contains an ethylene unit and/or an α-olefin unit having 4 to 10 carbon atoms in an amount of 0.1 to 40% by weight, and a propylene unit in an amount of 60 to 99.9% by weight, provided that the total of the propylene unit, ethylene unit and α-olefin unit is 100% by weight.

3. The polypropylene resin composition according to claim 1, wherein the propylene polymer satisfies the following requirements (c), (d) and (e):
   (c) the propylene polymer is a polymer comprising propylene homopolymer component (I), which has an intrinsic viscosity ([η]$_I$) of 0.1 to 5 dl/g measured at 135° C. in tetralin, and propylene copolymer component (II), which has an intrinsic viscosity ([η]$_{II}$) of 1 to 20 dl/g measured at 135° C. in tetralin;
   (d) propylene copolymer component (II) contains 20 to 99% by weight of a propylene unit and 1 to 80% by weight of an ethylene unit and/or an α-olefin unit having 4 to 10 carbon atoms, provided that the total of all the units is 100% by weight; and
   (e) the propylene polymer contains 1 to 50% by weight of propylene copolymer component (II), provided that the total of propylene homopolymer component (I) and propylene copolymer component (II) is 100% by weight.

4. The polypropylene resin composition according to claim 1, wherein the metal salt is calcium 1,2-cyclohexanedicarboxylate.

5. A process for producing the polypropylene resin composition of claim 1, comprising the steps of:
   (1) mixing 1 to 100 parts by weight of a metal salt represented by following formula (1) with 100 parts by weight of a propylene polymer, or 100 parts by weight of an ethylene polymer, wherein the ethylene polymer is an ethylene-α-olefin copolymer containing 51 to 99% by weight of an ethylene unit and 1 to 49% by weight of an α-olefin unit having 4 to 10 carbon atoms, and having a density of 0.85 to 0.93 g/cm$^3$, and a melt flow rate of 0.5 to 50 g/10 minutes measured at 190° C. under a load of 2.16 kg, provided that the total of the ethylene unit and the α-olefin unit is 100% by weight, or 100 parts by weight of a mixture containing the propylene polymer and the ethylene polymer, thereby producing a master batch; and (2) mixing the master batch with another mixture containing the propylene polymer and the ethylene polymer;

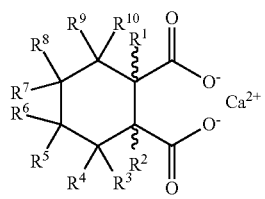

(I)

wherein $R^1$ to $R^{10}$ are independently of one another a hydrogen atom, an alkyl group having 1 to 9 carbon atoms, a hydroxyl group, an alkoxy group having 1 to 9 carbon atoms, an amino group, an alkylamine group having 1 to 9 carbon atoms, a halogen atom, a phenyl group, or a group represented by the formula, $R\text{---}(R'\text{---}O)_n\text{---}$, R being an alkyl group having 1 to 3 carbon atoms, R' being an alkylene group having 2 or 3 carbon atoms, and n being an integer of 1 to 4; any two alkyl groups of $R^1$ to $R^{10}$ may be linked to each other, thereby forming a carbon ring having 3 to 6 carbon atoms; and $R^1$ and $R^2$ have a trans or cis configuration with each other.

6. The process according to claim 5, wherein the propylene polymer is a propylene random copolymer satisfying the following requirements (a) and (b):
(a) its melt flow rate is 0.5 to 200 g/10 minutes, measured at 230° C. under a load of 2.16 kg; and
(b) it contains an ethylene unit and/or an α-olefin unit having 4 to 10 carbon atoms in an amount of 0.1 to 40% by weight, and a propylene unit in an amount of 60 to 99.9% by weight, provided that the total of the propylene unit, ethylene unit and α-olefin unit is 100% by weight.

7. The process according to claim 5, wherein the propylene polymer satisfies the following requirements (c), (d) and (e):
(c) the propylene polymer is a polymer comprising propylene homopolymer component (I), which has an intrinsic viscosity ($[\eta]_I$) of 0.1 to 5 dl/g measured at 135° C. in tetralin, and propylene copolymer component (II), which has an intrinsic viscosity ($[\eta]_{II}$) of 1 to 20 dl/g measured at 135° C. in tetralin;
(d) propylene copolymer component (II) contains 20 to 99% by weight of a propylene unit and 1 to 80% by weight of an ethylene unit and/or an α-olefin unit having 4 to 10 carbon atoms, provided that the total of all the units is 100% by weight; and
(e) the propylene polymer contains 1 to 50% by weight of propylene copolymer component (II), provided that the total of propylene homopolymer component (I) and propylene copolymer component (II) is 100% by weight.

8. The process according to claim 5, wherein the metal salt is calcium 1,2-cyclohexanedicarboxylate.

* * * * *